(12) United States Patent
Liu

(10) Patent No.: US 12,485,804 B2
(45) Date of Patent: Dec. 2, 2025

(54) CHILD SAFETY SEAT WITH REVERSIBLE ISOFIX CONNECTORS

(71) Applicant: SUNNYLOVE BABY PRODUCTS ZHUHAI CO., LTD, Zhuhai (CN)

(72) Inventor: Xiu Ping Liu, Zhuhai (CN)

(73) Assignee: SUNNYLOVE BABY PRODUCTS ZHUHAI CO., LTD., Zhuhai (CN)

( * ) Notice: Subject to any disclaimer, the term of this patent is extended or adjusted under 35 U.S.C. 154(b) by 170 days.

(21) Appl. No.: 18/514,154

(22) Filed: Nov. 20, 2023

(65) Prior Publication Data

US 2024/0174140 A1 May 30, 2024

(30) Foreign Application Priority Data

Nov. 24, 2022 (CN) .......................... 202211483176.8

(51) Int. Cl.
*B60N 2/28* (2006.01)

(52) U.S. Cl.
CPC .................................. *B60N 2/2887* (2013.01)

(58) Field of Classification Search
CPC .... B60N 2/2887; B60N 2/2863; B60N 2/286; B60N 2/863; B60N 2/86
See application file for complete search history.

(56) References Cited

U.S. PATENT DOCUMENTS

| | | | |
|---|---|---|---|
| 9,315,123 B2* | 4/2016 | Guo ..................... | B60N 2/2827 |
| 10,556,523 B1* | 2/2020 | Rajasingham ....... | B60N 2/2851 |
| 10,569,673 B2* | 2/2020 | Anderson ............ | B60N 2/2875 |
| 11,981,235 B2* | 5/2024 | Guo ..................... | B60N 2/2887 |
| 2024/0308398 A1* | 9/2024 | He ........................ | B60N 2/2824 |

FOREIGN PATENT DOCUMENTS

| | | | | |
|---|---|---|---|---|
| CN | 105 539 221 A | | 5/2016 | |
| CN | 205468649 U | * | 8/2016 | |
| CN | 105539221 B | * | 3/2018 | ........... B60N 2/2887 |
| CN | 207311203 U | * | 5/2018 | |
| DE | 102012013268 B4 | * | 10/2017 | ........... B60N 2/2887 |
| GB | 2 495 798 A | | 4/2013 | |
| JP | 2007 168582 A | | 7/2007 | |
| WO | WO-2007020350 A1 | * | 2/2007 | ........... B60N 2/2893 |

OTHER PUBLICATIONS

CN 205468649 Translation (Year: 2016).*
DE 102012013268 Translation (Year: 2017).*
CN 105539221 Translation (Year: 2018).*
CN 207311203 Translation (Year: 2018).*

* cited by examiner

*Primary Examiner* — David R Dunn
(74) *Attorney, Agent, or Firm* — Che-Yang Chen

(57) ABSTRACT

The present invention discloses a child safety seat with reversible ISOFIX connectors. Each side of a seat body is equipped with a single ISOFIX connection assembly and can be flipped forward or backward relative to the seat body, and the direction of the eccentric notch is adjustable during the flipping process by a self-rotating linkage assembly. After a direction change, the ISOFIX connection assembly the eccentric notch can be adjusted to a safety-compliant angle and connected to the ISOFIX sockets of the car seat.

14 Claims, 17 Drawing Sheets

CHILD SAFETY SEAT WITH REVERSIBLE ISOFIX CONNECTORS

FIELD OF INVENTION

The present invention relates to child safety seats, particularly to a child safety seat with reversible ISOFIX connectors.

BACKGROUND OF THE INVENTION

Currently, child safety seats on the market are typically equipped with a single-headed connector core on either side of an independent base for locking into the ISOFIX interface of a motor vehicle seat. In addition, the independent base is equipped with a mechanism that allows the seat body to engage or rotate in two directions to adjust the seat body forward and backward. With such a structural design, the child safety seat tends to be relatively large in volume and weight. Since the base and the seat body are two separate components, it is not easy to carry and transport when moving from place to place, making it very cumbersome and resulting in a poor user experience. Therefore, the child safety seat with such a design structure cannot meet the needs of users who require lightweight and mobility.

To address the issue of bi-directional installation without an independent base, the current industry solution is to design the connector core as an elongated double-headed structure that is installed directly on the underbody of the seat body, allowing the base to lock in both forward and backward directions with the vehicle's ISOFIX interface. However, this design still has shortcomings. To meet safety regulations, the connector core is typically made of a steel structure. Doubling the length of the connector core directly doubles the weight. Although the base is eliminated, the weight is not reduced.

Besides, existing technology adopts such a solution: a rotation point is placed in the center of the base, allowing the connector cores to rotate 180° to switch directions forward and backward to connect with the ISOFIX sockets on the car seat. However, a simple rotation causes the standard eccentric notch of the connector cores to rotate in the opposite direction, meaning that a simple 180° rotation of the connector cores results in a non-safety compliant connection notch head that is not allowed by safety standards and cannot lock into the vehicle's ISOFIX interface.

To address the above technical issues, the present invention is proposed.

SUMMARY OF THE INVENTION

The technical problem to be solved by the present invention is to provide a child safety seat with reversible ISOFIX connectors. Each side of a seat body is equipped with a single ISOFIX connection assembly, which can be flipped forward or backward relative to the seat body, and the direction of the eccentric notch is adjustable during the flipping process by a self-rotating linkage assembly. This feature allows the ISOFIX connection assembly to easily reverse the direction change, and after the direction change, the eccentric notch can be adjusted to a safety-compliant angle and connected to the ISOFIX sockets on the car seat. In addition, since the seat body employs a single ISOFIX connection assembly on both sides, the total weight of the child safety seat is relatively light without disassembly, making it easy to carry and transport.

To solve the above technical problem, the present invention provides the child safety seat with reversible ISOFIX connectors comprising a seat body and ISOFIX connection assemblies. One end of the ISOFIX connection assembly is a free end having an eccentric notch for connecting with the ISOFIX sockets of the car seat. The other end is a rotating connection end that can be flipped and connected to the underbody center of the seat body and can be flipped forward or backward. Between the rotating connection end of the ISOFIX connection assembly and the seat body, there is a self-rotating linkage assembly that drives the ISOFIX connection assembly to self-rotate along its longitudinal axis to adjust the eccentric notch during the flipping process. A locking assembly is provided between the ISOFIX connection assembly and the underbody of the seat body to lock the ISOFIX connection assembly when it is flipped and self-rotates to a preset position. The self-rotating linkage assembly includes a gear connected with the ISOFIX connection assembly and a gear rack fixedly attached to the underbody of the seat body, where the gear can mesh with the gear rack, enabling the ISOFIX connection assembly to self-rotate along its longitudinal axis during the flipping process. The underbody of the seat body is equipped with a connection shaft, and the self-rotating linkage assembly further comprises a flipping joint connected with the connection shaft, where the flipping joint is rotatably connected with the rotating connection end of the ISOFIX connection assembly.

The rotating connection end of the ISOFIX connection assembly is equipped with a screw connection, and the flipping joint is provided with a threaded connection hole that mates with the screw connection, allowing the ISOFIX connection assembly to self-rotate relative to the flipping joint during the flipping process. The flipping joint is rotatably connected and moved synchronously with the connection shaft to enable the ISOFIX connection assemblies located on both sides of the seat body underbody to flip forward or backward in synchronism.

The ISOFIX connection assembly consists of a housing and a connector core that is telescopically adjustable within the housing with the eccentric notch located at the free end of the connector core. The ISOFIX connection assembly further includes locking adjustment buttons located on both sides of the housing to adjust the telescopic movement of the connector core relative to the housing. The underbody of the seat body is provided with a groove to accommodate the ISOFIX connection assembly, and the side of the groove on the underbody of the seat body is provided with a clearance space to avoid interference with the movement of the locking adjustment button.

The underbody of the seat body, on the side of the locking assembly, is further provided with a stop-lock linkage assembly. This assembly is used to brake and lock the movement of the locking assembly when the locking assembly is unlocked, and when the ISOFIX connection assembly is flipped and self-rotates to the preset position, it can trigger the locking assembly to lock the ISOFIX connection assembly. The locking assembly includes a lock hole provided at the free end of the ISOFIX connection assembly, respective locking members that can be inserted into or withdrawn from the lock hole provided at the underbody front and rear sides of the seat body, and an unlocking button provided on the seat body for driving the locking members.

The locking assembly further includes an elastic member for elastically pressing the locking member. The stop-lock linkage assembly comprises a flat spring that moves and connects with the locking member together and a triggering member that can elastically extend from the underbody of the seat body to trigger the locking members when the ISOFIX connection assembly is flipped and self-rotates to the preset position. The flat spring has a curved catch portion, and the triggering member is provided with a hook that engages the catch portion when the locking member is slid out of the lock hole by operating the unlocking button. The outer end of the triggering member is provided with a guiding structure so that when the outer end of the triggering member is pushed by the ISOFIX connection assembly, the hook pushes the flat spring to deform, causing the hook to disengage from the catch portion and then the locking member to elastically insert into the lock hole.

The outer end of the locking member is provided with a color indicator A, and the seat body is also provided with a window A for observing the color indicator A after the locking member is inserted into the lock hole.

In another embodiment of the locking assembly in the present invention, the locking assembly comprises a locking rotating member, a pulling hook, a hoop member, and an elastic damping member. The center of the locking rotating member is rotatably connected with the underbody of the seat body through a pivot. The pulling hook is elastically pulled by the elastic damping member and is slidably connected to the underbody of the seat body. One end of the locking rotating member is provided with a notch for buckling the pulling hook, and the other end of the locking rotating member is eccentrically pivotally connected to the hoop member. When the notch is buckled with the pulling hook, the hoop member can be flipped to clasp the free end of the ISOFIX connection assembly to lock the ISOFIX connection assembly. An arm of force applied to the notch by the pulling hook is greater than an arm of force applied to the locking rotating member by the hoop member.

The sliding end of the pulling hook is provided with a color indicator B, and the seat body is provided with a window B for observing the color indicator B after the hoop member clasps on the free end of the ISOFIX connection assembly and locks the ISOFIX connection assembly.

As a further improved solution of the locking assembly in the present invention, the locking assembly comprises a lock hole provided on the ISOFIX connection assembly, respective locking members provided on the front and rear sides of the seat body underbody to mate with the lock hole, and an unlocking button provided on the seat body to drive the locking member to move along its axial direction. The locking assembly on the front side of the underbody of the seat body further comprises a connection shaft sleeve rotatably connected to the corresponding locking member, and a supporting rod connected to the corresponding locking member, which can rotate and flip around the locking member relative to the seat body. The connection shaft sleeve is also axially connected and moved synchronously with the corresponding locking member. The other end of the two supporting rods is equipped with a lock pin that is inserted into the lock hole on the front side of the underbody of the seat body when the ISOFIX connection assembly is rotated to the preset angle. The unlocking button on the front of the seat body underbody is connected with the connection shaft sleeve to drive the connection shaft sleeve to push the corresponding locking member to move axially and unlock. The side of the seat body underbody where the locking assembly is located is also equipped with a stop-lock linkage assembly that can trigger the locking assembly to lock the ISOFIX connection assembly after unlocking.

The stop-lock linkage assembly at the rear side of the seat body underbody comprises a flat spring that moves in concert with the corresponding locking member, and a triggering member that can elastically extend from the seat body underbody to trigger the locking member when the ISOFIX connection assembly is flipped and self-rotates to the preset position. The flat spring has a curved catch portion, and the triggering member is provided with a hook that engages the catch portion when the unlocking button is operated to cause the locking member to slide out of the lock hole. The outer end of the triggering member has a guiding structure; the stop-lock linkage assembly at the front side of the seat body underbody comprises a flat spring connected and moved synchronously with the connection shaft sleeve, and a triggering member that can elastically extend from the seat body underbody to trigger the locking member when the ISOFIX connection assembly is flipped and self-rotates to the preset position in the groove. The flat spring also has a curved catch portion, and the triggering member thereon is provided with a hook that engages with the catch portion when the unlocking button is operated to drive the connection shaft sleeve to push the locking member inwardly and out of the lock hole, wherein the outer end of the triggering member has a guiding structure.

At least on the front side of the seat body underbody, there is a triggering button, and each triggering button is connected and moved synchronously with the triggering member to indirectly or directly trigger the locking member for locking.

The other end of the two supporting rods is connected with a crossbar, and a guide sleeve is slidably connected between the inner ends of the two crossbars. Inside the guide sleeve, a pushing spring is provided to press the inner ends of the two crossbars at both ends thereof.

Compared to the prior art, the child safety seat with reversible ISOFIX connectors of the present invention has the following advantages:

1. The ISOFIX connection assembly can be flipped forward and backward to connect with the center of the seat body underbody, and with the self-rotating linkage assembly, it allows the ISOFIX connection assembly to self-rotate during flipping. The purpose of the self-rotation is to adjust the eccentric notch of the ISOFIX connection assembly in a direction that complies with safety regulations, ensuring a compliant and secure connection to the ISOFIX sockets on the car seat and reliable connection safety when the child safety seat is used in a motor vehicle.

2. Since the ISOFIX connection assembly can be flipped and self-rotate to reverse synchronously, it meets the application requirements for connection and installation with bi-directional seat body change while satisfying the user's need for synchronous bi-directional change.

3. The ISOFIX connection assembly of the present invention, as compared to the prior art, effectively avoids the double-headed connection structure with two connector cores on one side of the seat body underbody and eliminates the need for a base, significantly reducing the total weight of the child safety seat. This facilitates a lightweight structural design, making it more convenient for users to carry and transport.

4. In the present invention, after unlocking the ISOFIX connection assembly, the seat body can automatically flip by itself due to the gravity of the ISOFIX connection assembly, and automatically self-rotate during the flipping process to adjust the eccentric notch to a regulation-compliant position through the self-rotating linkage assembly, which provides convenience and prevents misuse, thus improving the user's operating experience.

5. In the present invention, when the ISOFIX connection assembly is unlocked and flipped to the other side to the preset position, it presses the stop-lock linkage assembly, which can then automatically lock the ISOFIX connection assembly to the underbody of the seat body, further optimizing the convenience of using the product of the present invention.

6. To further enhance the user experience, windows A and B are provided on the seat body. When the ISOFIX connection assembly is locked, the user can observe color indicators A or B through windows A or B to ensure that the ISOFIX connection assembly is securely locked.

7. In the present invention, the ISOFIX connection assemblies are configured on both sides and synchronously flipped through the connecting axis, which further enhances the convenience of its forward or rearward rotation.

8. The supporting rod is provided on the front side of the seat body underbody. When the lock pin of the supporting rod is inserted into the lock hole of the ISOFIX connection assembly, which is flipped to the preset angle on the front side of the seat body underbody, an incline is created in the seat body. This allows users to make multiple angle adjustments as needed and quickly and accurately lock the support angle at the set incline after installing the child safety seat.

9. To help the user accurately position the incline of the seat body and accurately align the lock hole on the ISOFIX connection assembly, a guiding slot is provided on the side of the ISOFIX connection assembly lock hole. When the supporting rod on the locking member is in the open position and the ISOFIX connection assembly is flipped and stopped by the guiding slot abutting the lock pin, the lock pin can be accurately inserted into the lock hole by simply triggering the locking button with one hand.

10. To facilitate the insertion of the lock pin into the lock hole for locking, a triggering button is provided on the front side of the seat body underbody, allowing the user to insert the lock pin into the lock hole with one hand.

11. To facilitate the insertion of the lock pin into the lock hole for locking, the pushing springs are provided between the inner ends of the two crossbars, and the elastic members are provided between the inner ends of the two locking members to assist the insertion of the lock pin into the lock hole. Meanwhile, the unlocking button is provided on the front side of the seat body underbody, allowing the user to smoothly release the lock of the lock pin by operating the unlocking button.

BRIEF DESCRIPTION OF THE DRAWINGS

Specific embodiments of the present invention are described in further detail below in conjunction with the accompanying drawings, wherein.

DETAILED DESCRIPTION OF THE PREFERRED EMBODIMENTS

Figure 1:
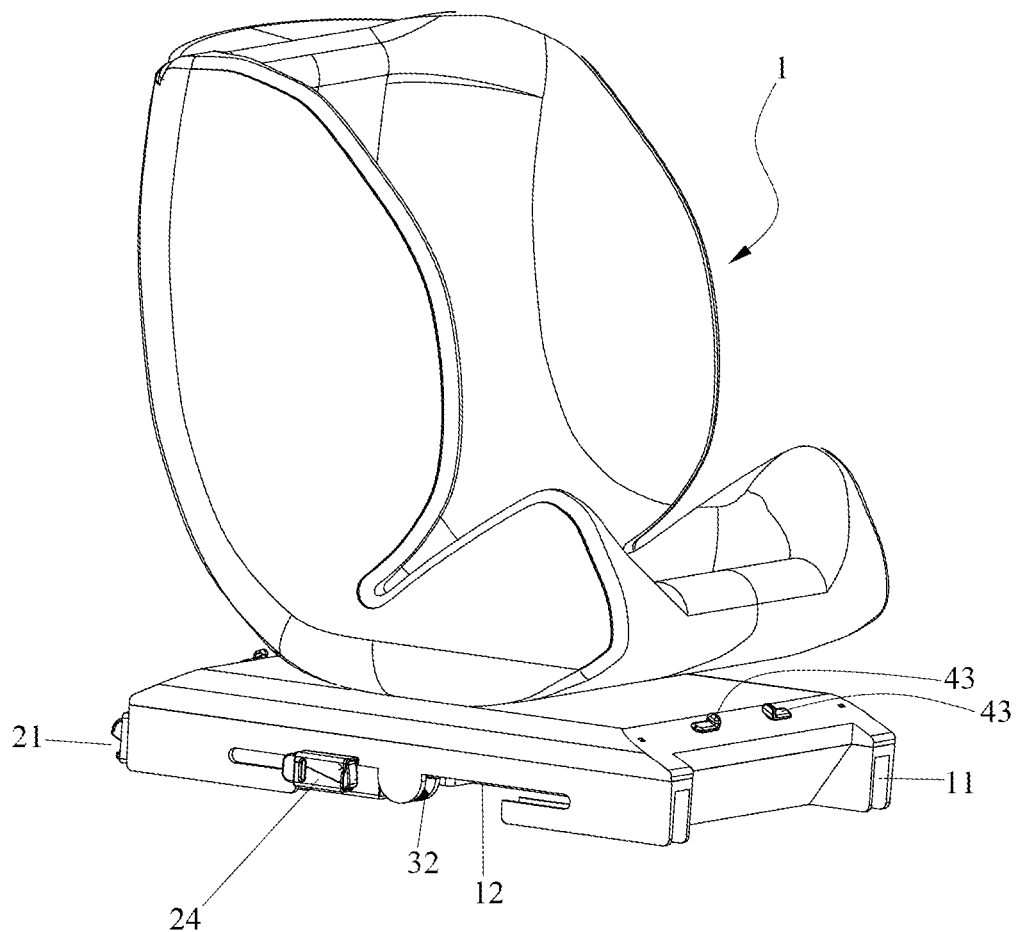
FIG. 1 is a first schematic diagram of the three-dimensional structure of the present invention.
Figure 2:
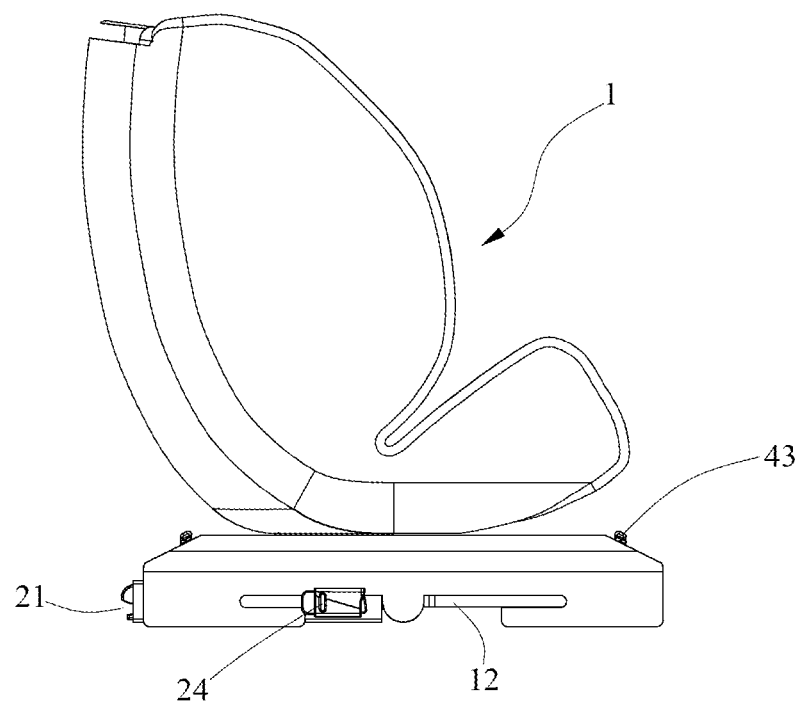
FIG. 2 is a side view of the present invention.
Figure 3:
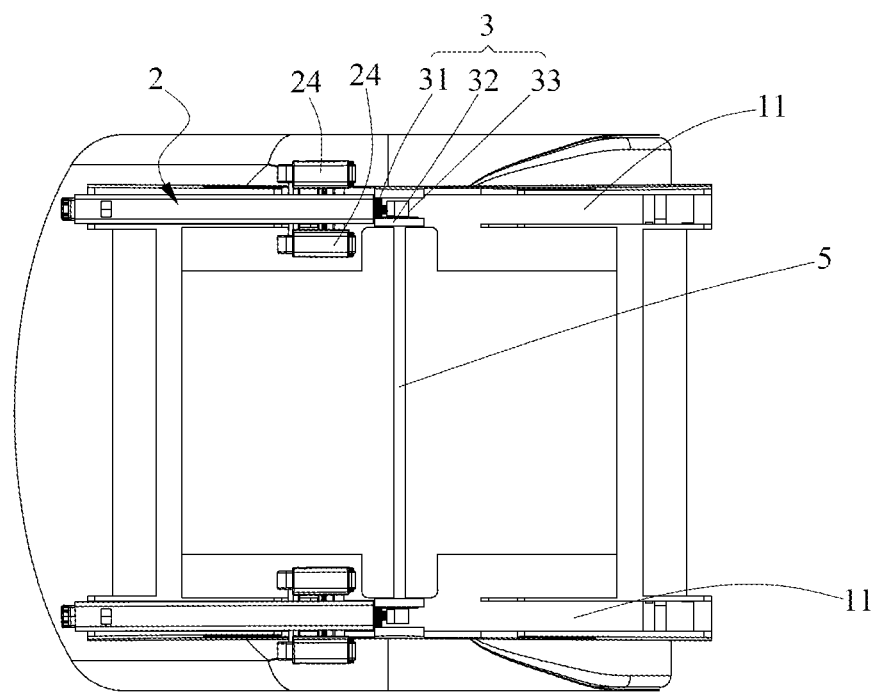
FIG. 3 is a bottom view of the present invention.
Figure 4:
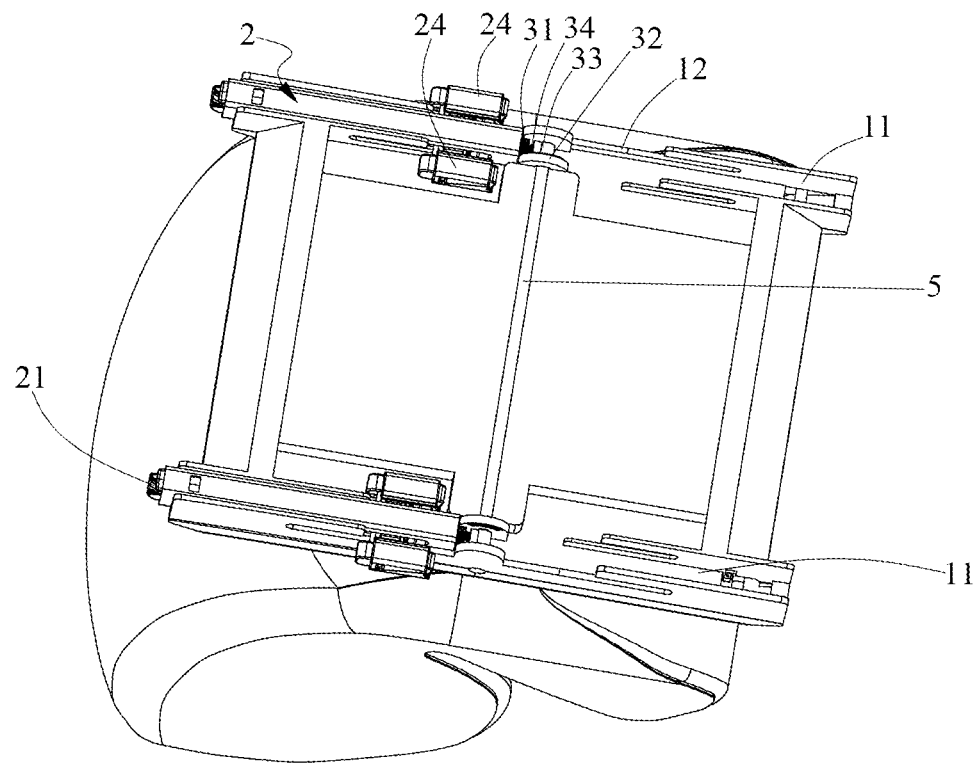
FIG. 4 is a second schematic diagram of the three-dimensional structure of the present invention.
Figure 5:
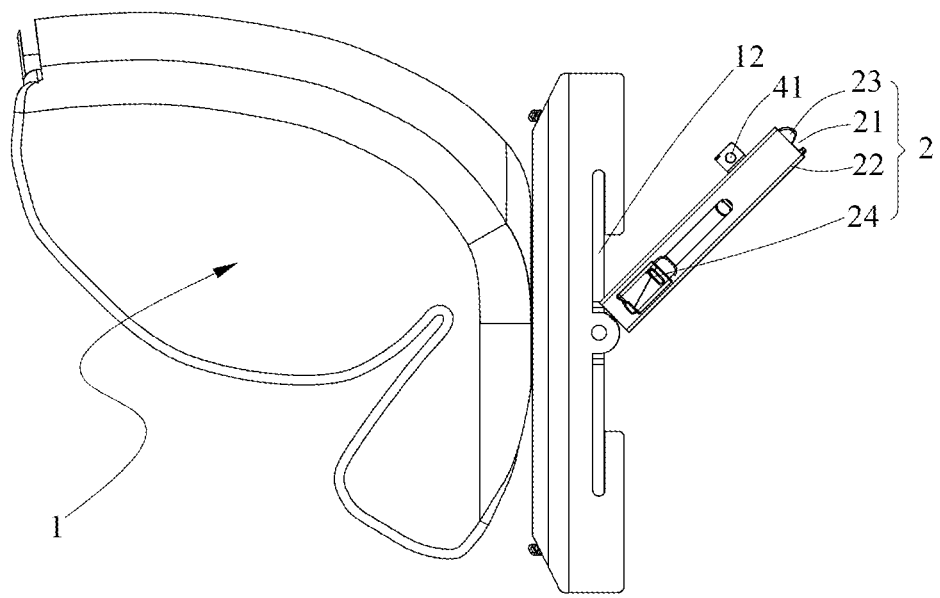
FIG. 5 is a schematic diagram of the present invention in a side-standing state in which the ISOFIX connection assembly is unlocked and flipped.
Figure 6:
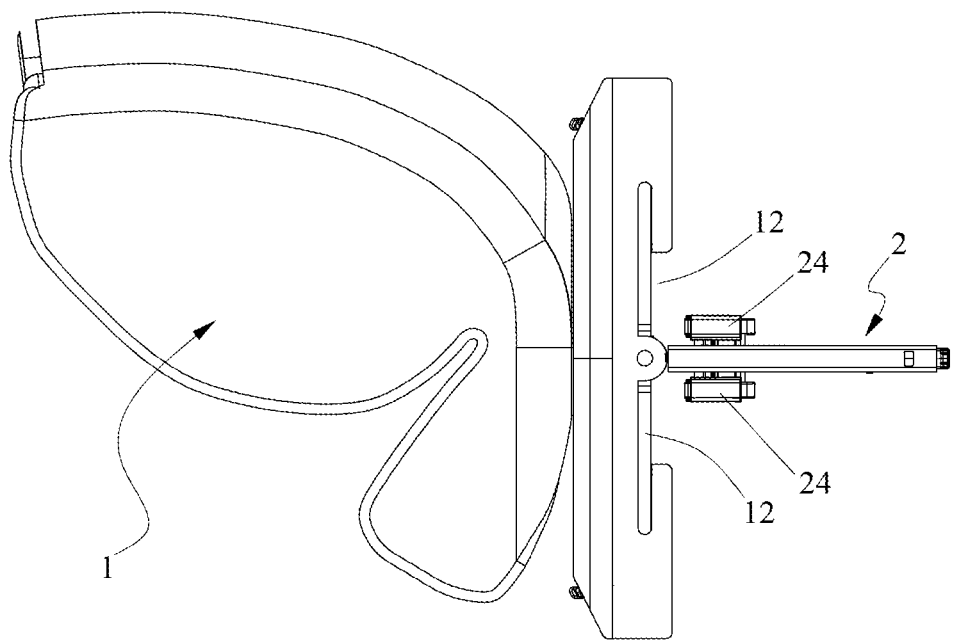
FIG. 6 is a schematic diagram of the present invention in a side-standing state to unlock the ISOFIX connection assembly and flip it to 90° under the effect of gravity.
Figure 7:
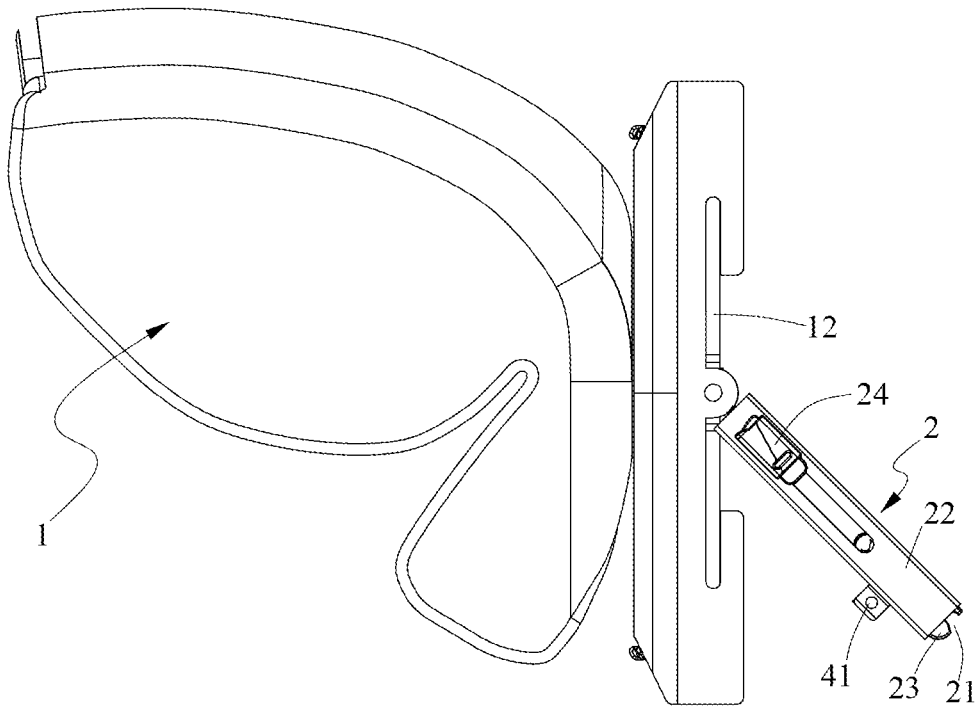
FIG. 7 is a schematic diagram of the present invention in a side-standing state in which the ISOFIX connection assembly is unlocked and flipped to the other side of the seat body under gravity.
Figure 8:
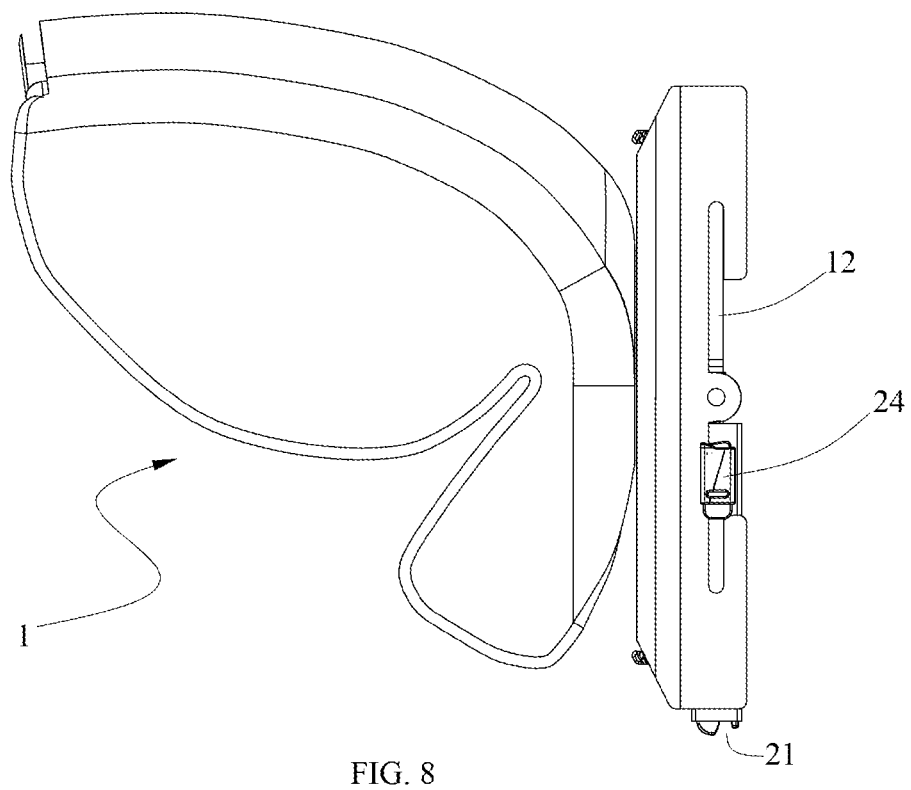
FIG. 8 is a schematic diagram of the present invention in a side-standing state in which the ISOFIX connection assembly is released from the locking state and completely flipped to the other side of the seat body and locked under gravity.
Figure 9:
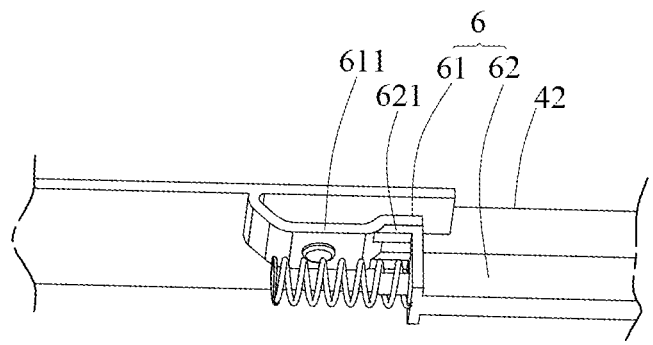
FIG. 9 is a schematic diagram of the structure of the abort lock linkage assembly of the present invention.
Figure 10:
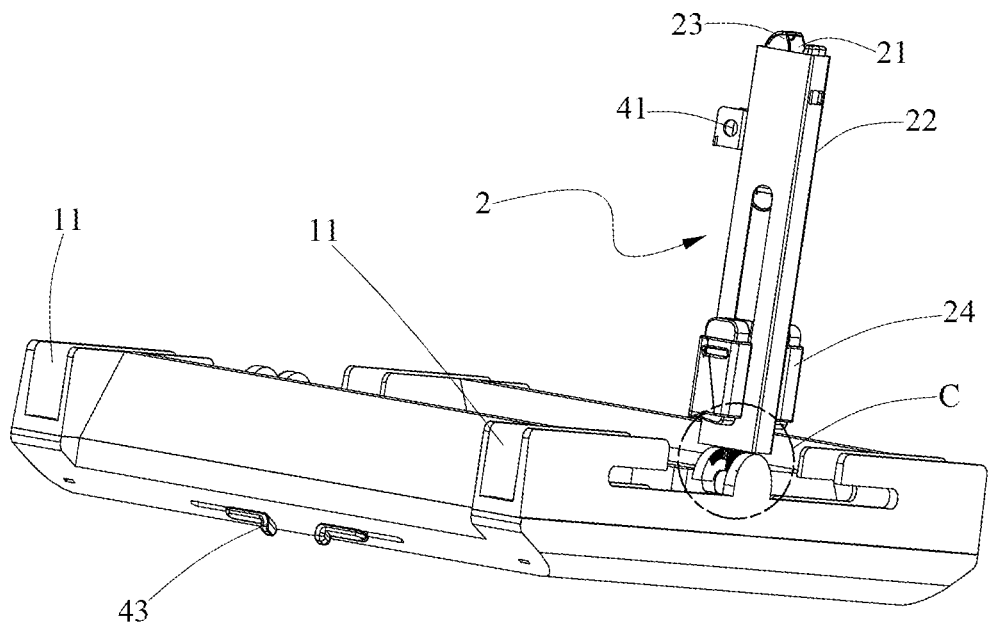
FIG. 10 is a schematic diagram of the structure of the ISOFIX connection assembly of the present invention flipped 90° relative to the seat body.

The embodiments of the present invention will now be described in detail with reference to the accompanying drawings.

As shown in FIGS. 1-28, the present invention includes a child safety seat with a reversible ISOFIX connector comprising a seat body 1 and ISOFIX connection assembles 2. One end of the ISOFIX connection assembly 2 is a free end having an eccentric notch 21 for connection with the ISOFIX socket of a car seat. The other end is a rotating connection end that can be flipped and connected to the underbody center of the seat body 1 and can be flipped forward or backward. Between the rotating connection end of the ISOFIX connection assembly 2 and the seat body 1, there is a self-rotating linkage assembly 3 that drives the ISOFIX connection assembly 2 to self-rotate along its longitudinal axis to adjust the eccentric notch 21 during the flipping process. A locking assembly 4 is provided between the part of the ISOFIX connection assembly 2 away from the rotating connection end and the underbody of the seat body 1 to lock the ISOFIX connection assembly 2 when it is flipped and self-rotates to a preset position. With this technical solution, the ISOFIX connection assembly can be conveniently rotated and the eccentric notch can be adjusted to comply with the safety regulations for connecting to the ISOFIX socket on the car seat, while at the same time allowing the child safety seat to be light and portable without disassembly.

As shown in FIGS. 3, 4 and 10, 11, the self-rotating linkage assembly 3 includes a gear 31 that moves in concert with the ISOFIX connection assembly 2 and a gear rack 32 that is fixed to the underbody of the seat body 1. The gear 31 is a bevel gear, and the teeth on the gear rack 32 are distributed in a sector shape so that the gear 31 can mesh with the gear rack 32. The number of teeth on the gear 31 and the gear rack 32 is the same, ensuring that the ISOFIX connection assembly self-rotates exactly 180° when flipped, aligning the eccentric notch with the ISOFIX socket on the car seat. Alternatively, if the number of teeth on the gear rack 32 is an odd multiple of the number of teeth on the gear 31, the ISOFIX connection will rotate the odd multiple of 180° during flipping, which also aligns the eccentric notch 21 with the ISOFIX socket of the car seat. This satisfies the requirement for reversible connection of the seat body and the user's need to change directions, ensuring a safe and reliable connection.

Figure 23:
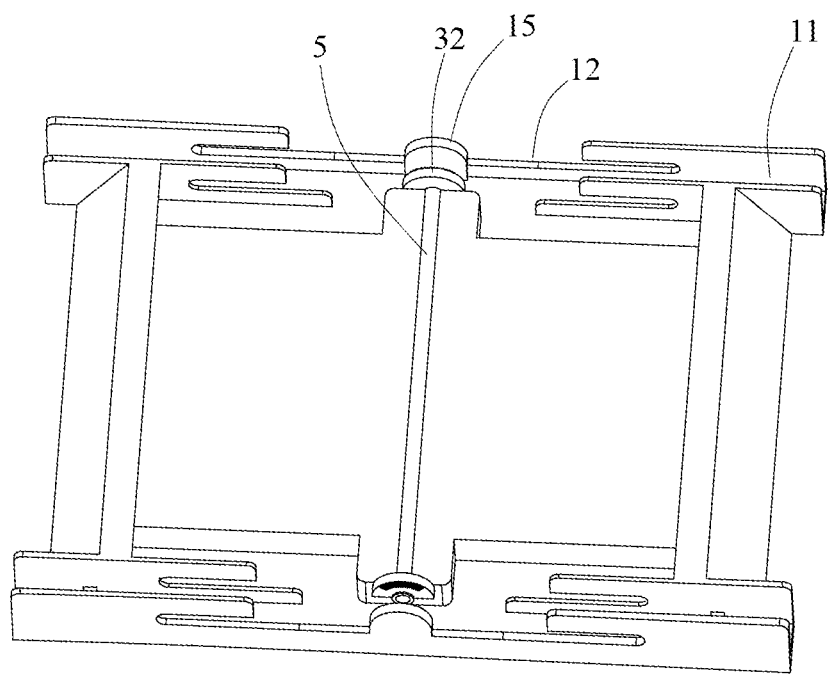
FIG. 23 is a schematic diagram of the structure of the groove, the clearance space setting and the connection with the connection shaft on the underbody of the seat body of the present invention.
Figure 24:
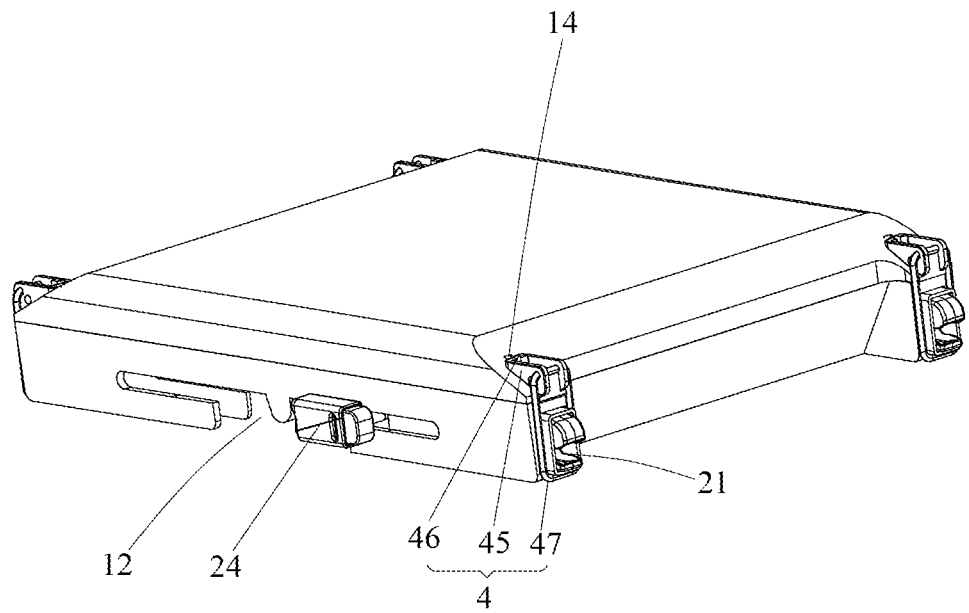
FIG. 24 is a first schematic diagram of a structure in which another locking assembly is used on the seat body of the present invention.
Figure 25:
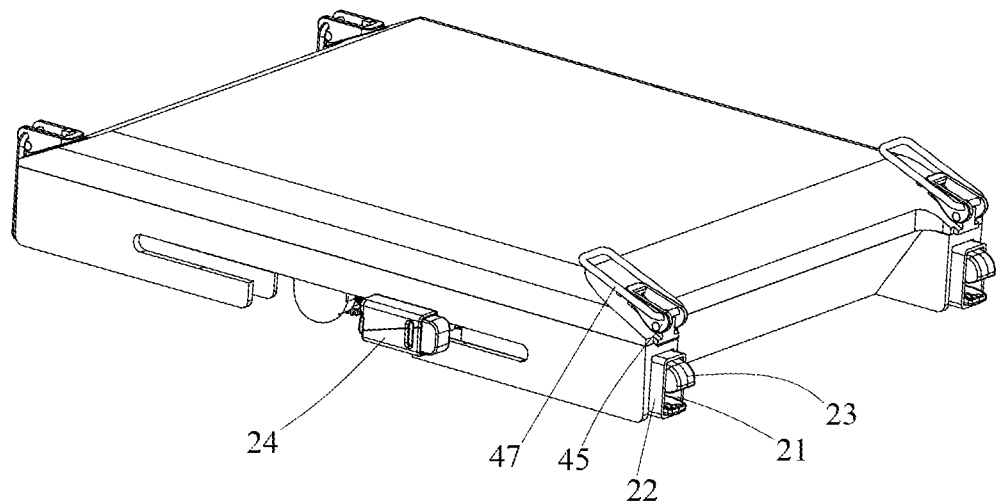
FIG. 25 is a schematic diagram a second schematic diagram of a structure in which another locking assembly is used on the seat body of the present invention.
Figure 26:
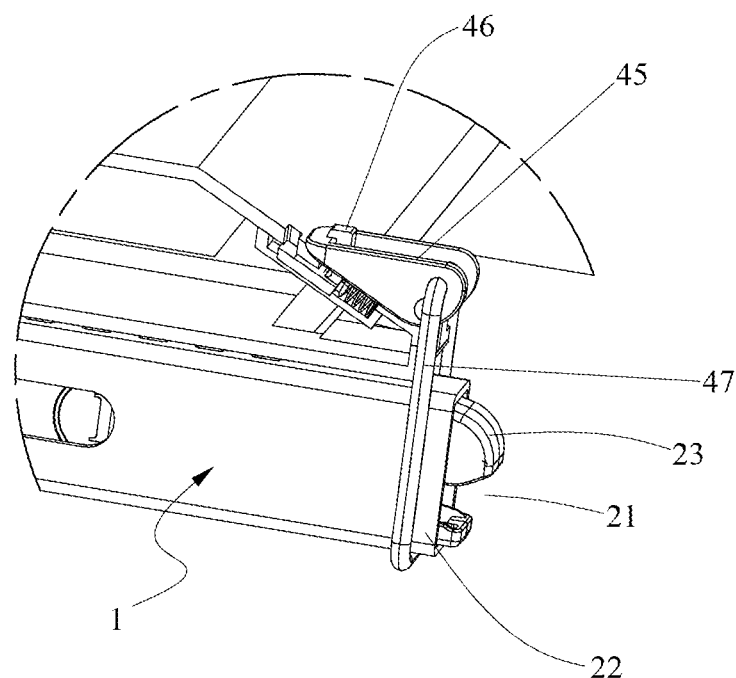
FIG. 26 is a first partial enlarged view of another locking assembly of the present invention.
Figure 27:
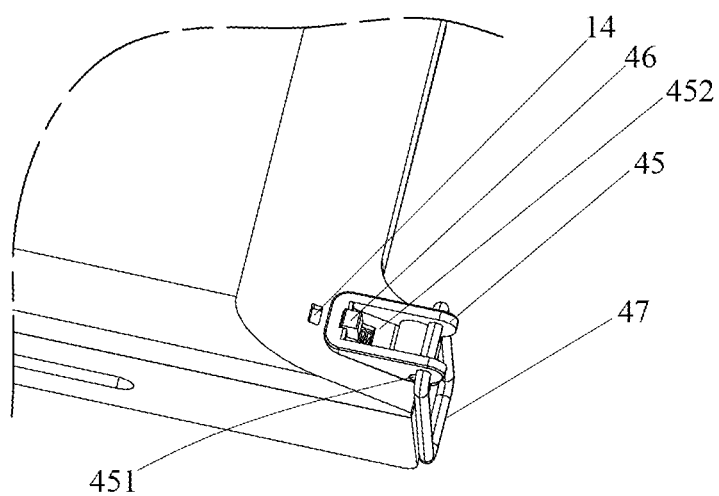
FIG. 27 is a second partial enlarged view of another locking assembly of the present invention.
Figure 28:
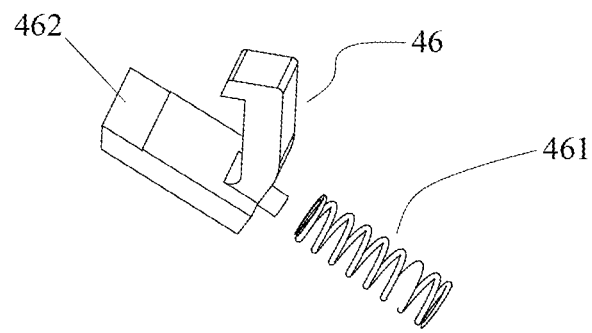
FIG. 28 is a schematic view of the structure of a pulling hook in another locking assembly of the present invention.

As shown in FIG. 23, to ensure a stable and reliable meshing transmission between gear 31 and gear rack 32, a block 15 is provided opposite gear rack 32 on the underbody of seat body 1. The block 15 abuts the gear 31 when it meshes with the gear rack 32, thereby forming a gap for the gear 31 to pass through.

Figure 11:
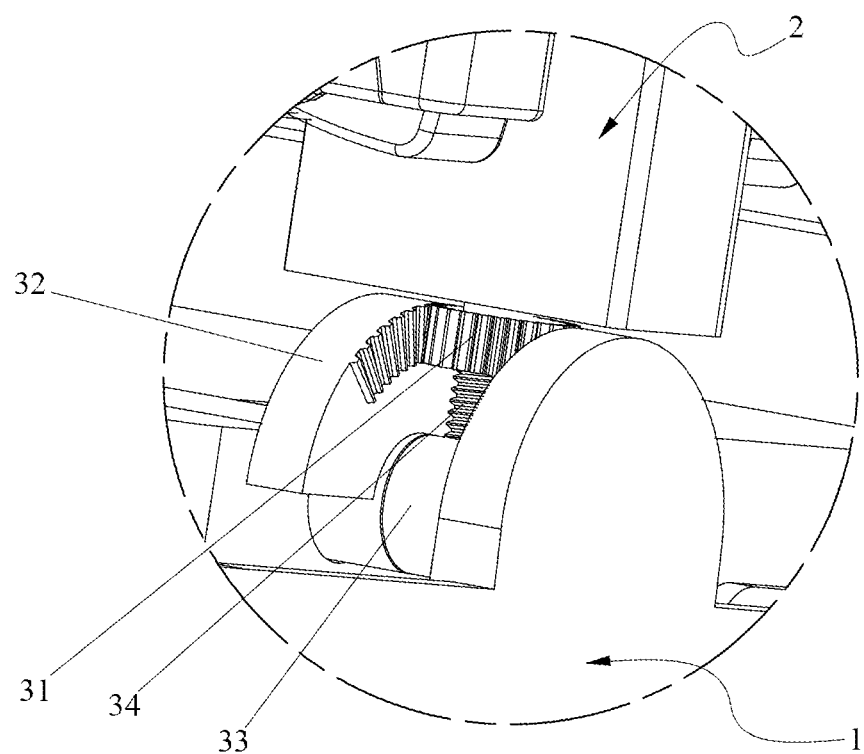
FIG. 11 is an enlarged view of symbol C of FIG. 10.
Figure 12:
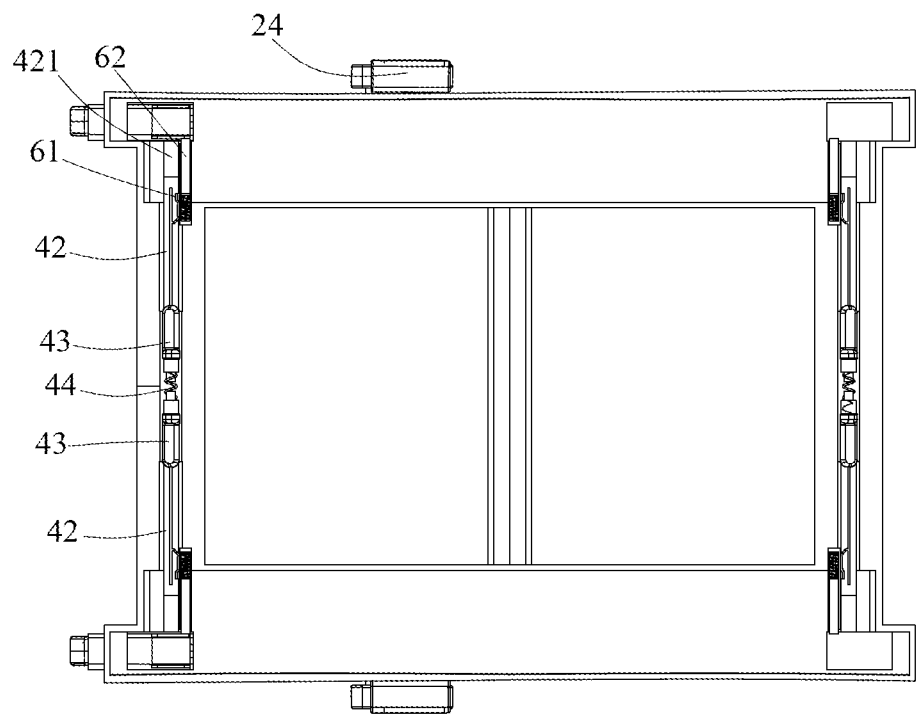
FIG. 12 is a schematic diagram of the internal connection at the underbody of the seat body of the present invention.
Figure 13:
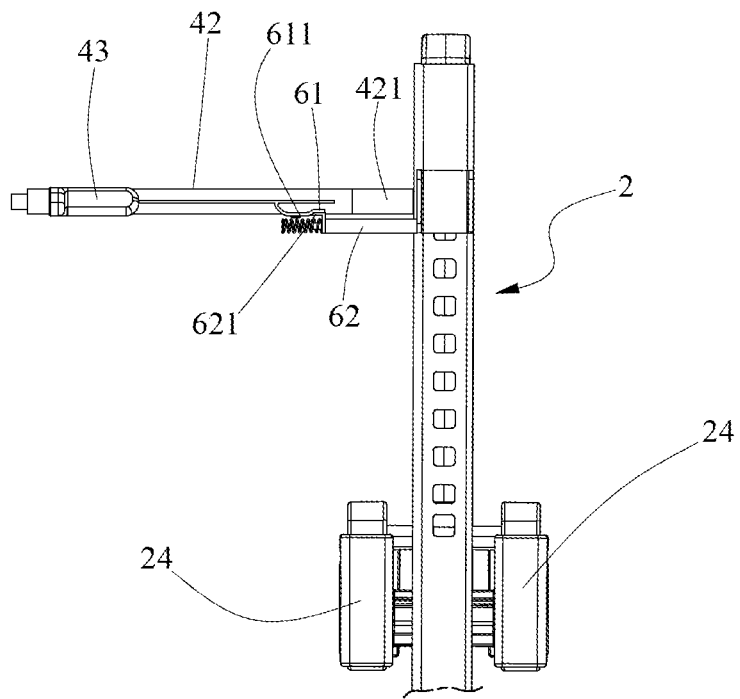
FIG. 13 is a schematic diagram of the locking assembly unlocking the ISOFIX connection assembly and the locking assembly cooperating state with the stop-lock linkage assembly of the present invention.
Figure 21:
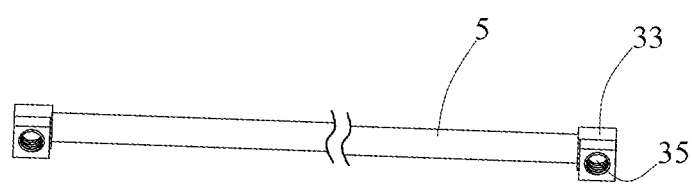
FIG. 21 is a schematic diagram of the three-dimensional structure of the connection shaft of the present invention.
Figure 22:
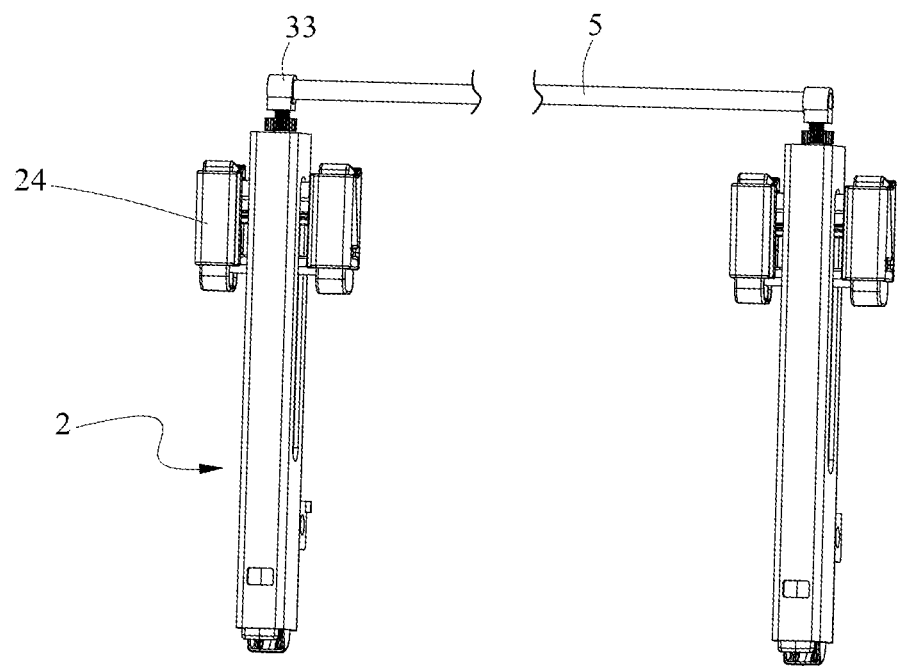
FIG. 22 is a schematic diagram of the structure of the connection shaft connecting with the two ISOFIX connection assemblies of the present invention.

As shown in FIGS. 11 and 21, the underbody of the seat body 1 is equipped with a connection shaft 5, and the self-rotating linkage assembly 3 further includes a flip joint 33 connected to the connection shaft 5. The flip joint 33 is rotatably connected to the rotating connection end of the ISOFIX connection assembly 2. This rotating connection can be a pivot rotation connection or a threaded rotation connection. When the threaded rotation connection is used, the rotating connection end of the ISOFIX connection assembly 2 has a screw connection 34 that is fixedly connected to a housing 22 of the ISOFIX connection assembly 2, and the flip joint 33 has a threaded connection hole 35 that mates with the screw connection 34, allowing the ISOFIX connection assembly 2 to self-rotate relative to the flip joint 33 during flipping.

To achieve synchronous flipping of the ISOFIX connection assemblies on both sides of the seat body 1, the connection shaft 5 is connected and moved synchronously with the flip joint 33. When the ISOFIX connection assembly 2 flips forward or backward, the threaded connection hole 35 of the flip joint 33 engages with the screw connection 34 of the ISOFIX connection assembly 2, allowing the ISOFIX connection assembly 2 to self-rotate correspondingly, screwing in or out, while the screw connection 34 always maintains a significant number of threads connected with the threaded connection hole 35 to ensure connection strength.

Figure 19:
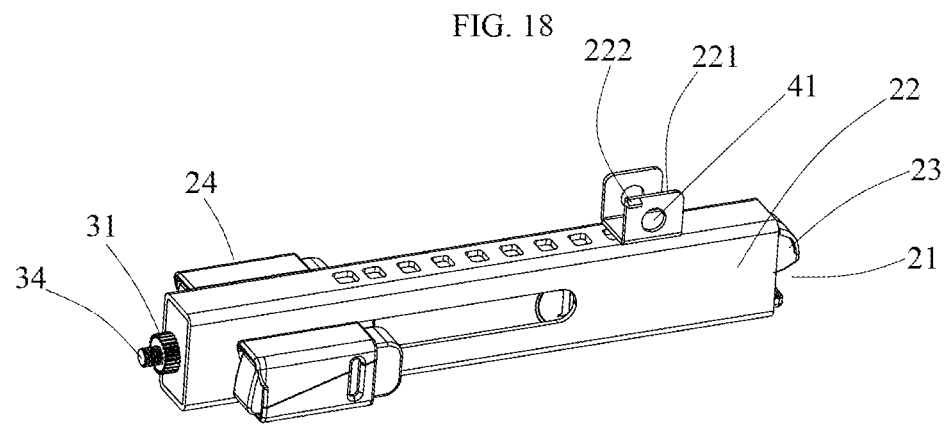
FIG. 19 is a schematic diagram of the three-dimensional structure of the locking ISOFIX connection assembly of the present invention.

As shown in FIG. 19, the ISOFIX connection assembly 2 consists of a housing 22 and a connector core 23 that is telescopically adjustable within the housing 22 with the eccentric notch 21 located at the outer end of the connector core 23. The ISOFIX connection assembly 2 further includes locking adjustment buttons 24 located on both sides of the housing 22 to adjust the telescopic movement of the connector core 23 relative to the housing 22. The structure of the connector core 23 is disclosed in Chinese patent ZL201820031750.9. The difference in the ISOFIX connection assembly 2 of the present invention is that the locking adjustment buttons 24 are formed on both sides of the same connector core 23. The two locking adjustment buttons 24 on the same connector core 23 are connected so as to move in unison; regardless of which one is operated, it can slidably adjust and lock the connector core 23 relative to the housing 22.

As shown in FIGS. 1, 2, 4-8, and 23-25, the underbody of the seat body 1 is provided with a groove 11 to accommodate the ISOFIX connection assembly 2, and the side of the groove 11 on the underbody of the seat body 1 is provided with a clearance space 12 to avoid interference with the movement of the locking adjustment button 24. After the ISOFIX connection assembly 2 completes flipping and self-rotating, it is fully embedded in the groove 11, making the structure compact. The clearance space 12 includes a clearance notch near the connection shaft 5 and a slot extending from the clearance notch in the direction of the front and rear sides of the seat body. When the ISOFIX connection assembly 2 is flipped, the locking adjustment button 24 should be set to the position of the clearance notch beforehand, otherwise, interference will prevent unlocking and flipping.

As shown in FIGS. 13-18, the underbody of the seat body 1, on the side of the locking assembly 4, is further provided with a stop-lock linkage assembly 6. This assembly is used to brake and lock the movement of the locking assembly 4 when the locking assembly 4 is unlocked, and when the ISOFIX connection assembly 2 flips and self-rotates to the preset position, it can trigger the locking assembly 4 to lock the ISOFIX connection assembly 2. Thus, when the ISOFIX connection assembly 2 is flipped and self-rotates to the preset position, i.e., when the ISOFIX connection assembly 2 is already embedded in the groove 11, it can be automatically locked without additional user operation, making the operation more convenient.

The locking assembly 4 includes a lock hole 41 provided at the free end of the ISOFIX connection assembly 2, respective locking members 42 that can be inserted into or withdrawn from the lock hole 41 provided at the underbody front and rear sides of the seat body 1, and an unlocking button 43 provided on the seat body 1 for driving the locking members 42. The lock hole 41 is provided on the housing 22, specifically, as shown in FIG. 19, U-shaped connecting ears 221 are provided on the housing 22, and the lock holes 41 are provided on both sides of the connecting ears 221. The locking assembly 4 also includes elastic members 44 for elastically pressing the locking members 42. Both ends of the elastic member 44 elastically abut both locking members 42, respectively.

In an embodiment of the present invention, the unlocking button 43 is connected and moved synchronously with the locking member 42 to slide the locking member along its axial direction. When the user operates the unlocking button 43 to overcome the spring force of the elastic member 44, the unlocking button 43 drives the locking members 42 to slide axially and disengage from the lock hole 41, thereby unlocking the ISOFIX connection assembly 2.

As shown in FIGS. 13 and 15-20, the stop-lock linkage assembly 6 includes a flat spring 61 connected and moved synchronously with the locking member 42 and a triggering member 62 that can elastically extend at one end from the underbody of the seat body 1 to trigger the locking members when the ISOFIX connection assembly 2 is flipped and self-rotates to the preset position. The flat spring 61 has a curved catch portion 611, and the triggering member 62 is provided with a hook 621. When the unlocking button 43 is operated to drive the locking member 42 to slide axially and disengage from the lock hole 41, the catch portion 611 that is connected with the locking member 42 is moved with the locking member 42, and when the catch portion 611 elastically engages with the hook 621, the locking member 42 is unlocked and retracted to prevented sliding out.

Figure 14:
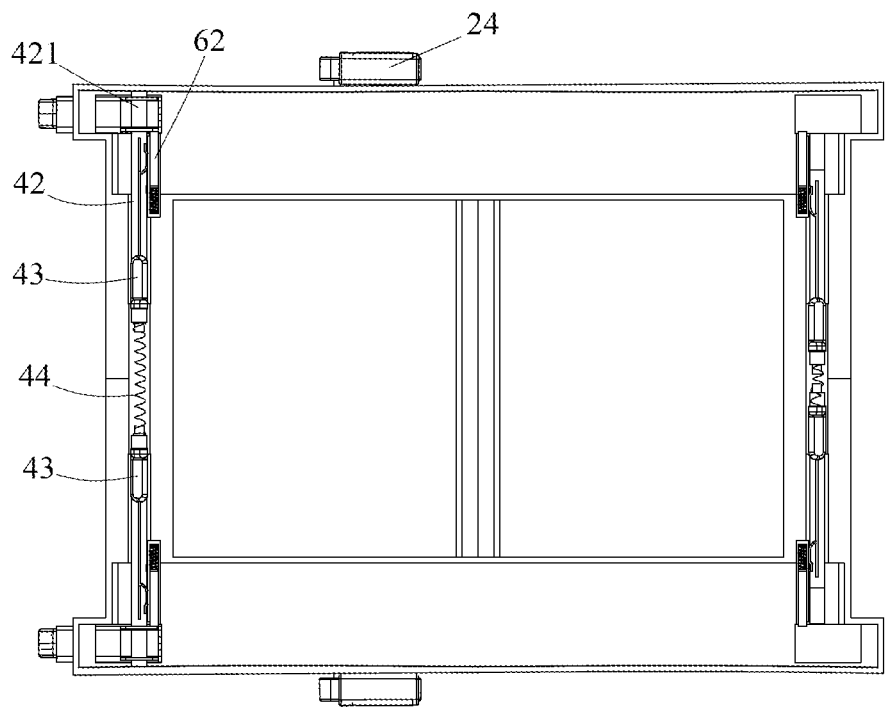
FIG. 14 is a schematic diagram of the underbody interior of the seat body of the present invention showing the state of the locking assembly locking the ISOFIX connection assembly.
Figure 15:
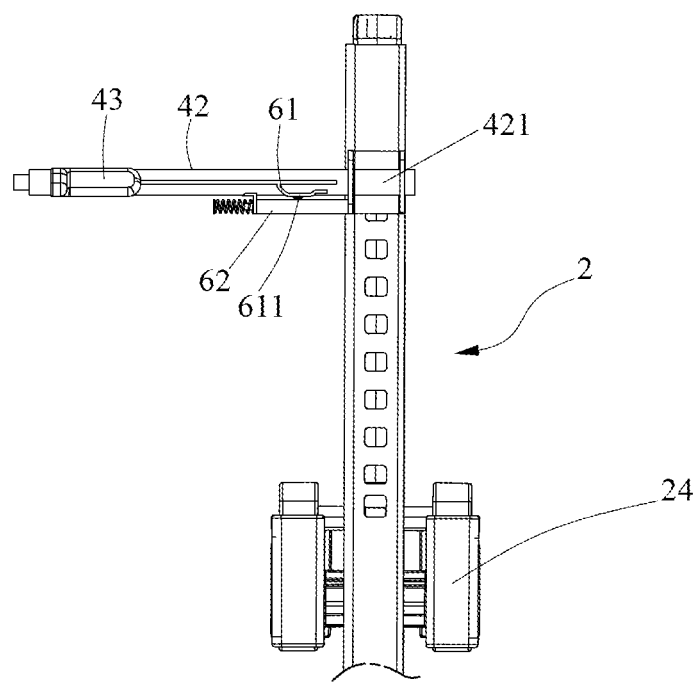
FIG. 15 is a schematic diagram of the present invention showing the state of the locking assembly locking the ISOFIX connection assembly and the state of the locking assembly cooperating with the stop-lock linkage assembly.
Figure 16:
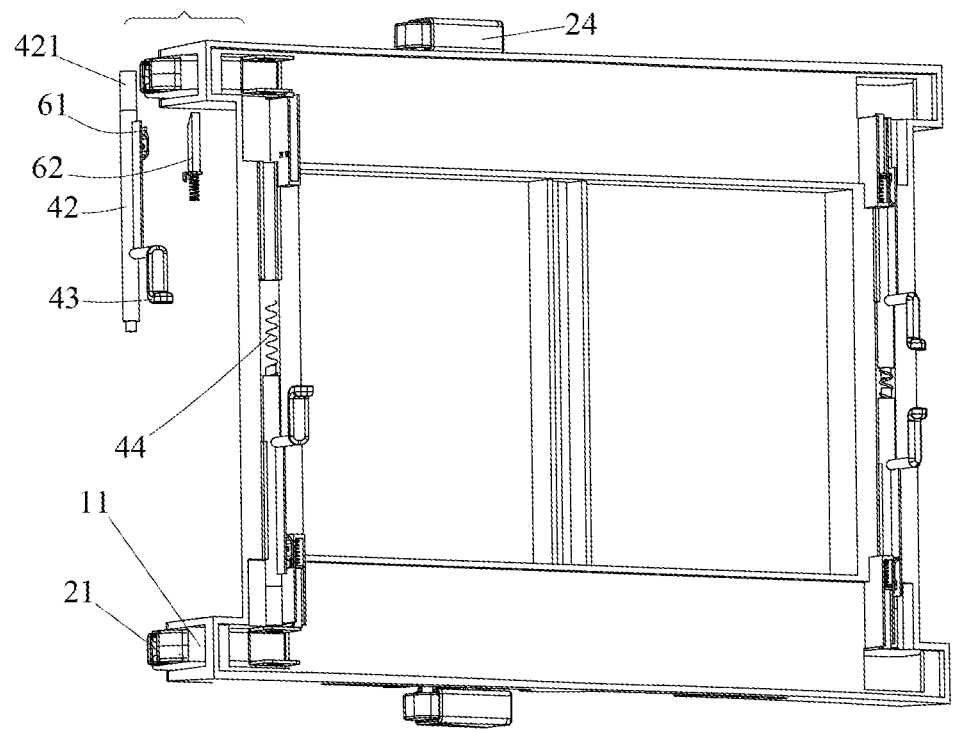
FIG. 16 is a schematic diagram of a partial decomposition of the locking assembly and the stop-lock linkage assembly in the underbody of the seat body of the present invention.
Figure 17:
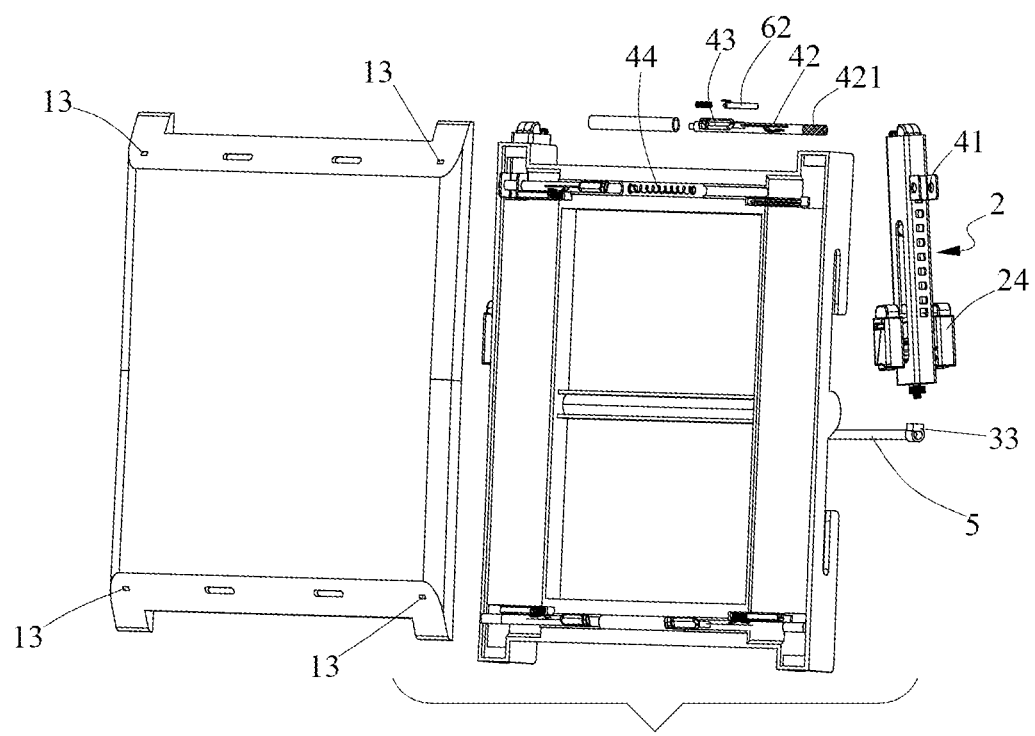
FIG. 17 is a schematic diagram of the decomposition of the underbody of the seat body of the present invention.
Figure 18:
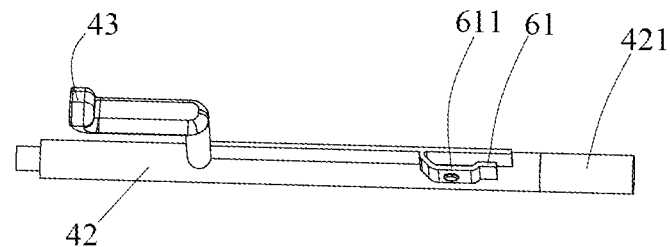
FIG. 18 is a schematic diagram of the structure of the locking member of the present invention.
Figure 20:
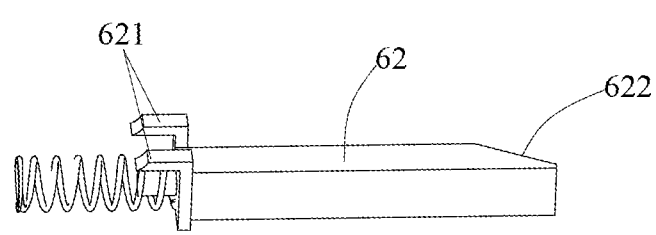
FIG. 20 is a schematic diagram of the three-dimensional structure of the triggering member of the present invention.

As shown in FIG. 20, the triggering member 62 has an outer end equipped with a guiding structure 622. To facilitate cooperation with the guiding structure 622, regardless of whether the ISOFIX connection assembly 2 is flipped to the front or rear side at the underbody of the seat body 1, corresponding guiding inclined surfaces 222 are provided on both sides of the connecting ear 221. When the ISOFIX connection assembly 2 is flipped and self-rotates to the preset position, the guiding inclined surface 222 contacts the guiding structure 622, causing the triggering member 62 to elastically retract and, in turn, driving the hook 621 to slide inward together. The hook 621 then presses against the flat spring 61, causing it to elastically deform until the hook 621 disengages from the catch portion 611. At this moment, as shown in FIG. 14, after the locking member 42 is released from the locking limit, it is elastically inserted into the lock hole 41 under the action of the elastic member 44.

To further enhance usability and to ensure that the ISOFIX connection assembly is reliably locked, the outer end of the locking member 42 has a color indicator A421 that can be marked green as needed. The seat body 1 is also provided with a window A13 through which the color indicator A421 can be observed after the locking member 42 is inserted into the lock hole 41.

As shown in FIGS. 24-28, in another embodiment of the locking assembly 4 of the present invention, the locking assembly 4 comprises a rotary member 45, a pulling hook 46, and a hoop member 47. The center of the rotary member 45 is pivotally connected to the front or rear side of the underbody of the seat body 1 by a pivot 451. The pulling hook 46 can slide elastically on the underbody of the seat body 1. One end of the rotary member 45 has a notch 452 for engagement with the pulling hook 46, and the other end of the rotary member 45 is eccentrically pivotally connected to the hoop member 47. The locking assembly 4 further includes an elastic damping member 461 disposed on the seat body 1 to elastically resist the pulling hook 46 being pulled by the rotary member 45. When the notch 452 engages with the pulling hook 46, the hoop member 47 is flipped, allowing it to clasp the free end of the ISOFIX connection assembly 2, thereby locking it. To ensure that the locking is secure and reliable, the lever principle is adopted where an arm of force of the notch 452 applied to the pulling hook 46 is greater than an arm of force of the hoop member 47 applied to the rotary member 45.

Similarly, to further enhance usability and to ensure that the ISOFIX connection assembly is reliably locked, the sliding end of the pulling hook 46 has a color indicator B462, and the seat body 1 has a window B14 that allows the color indicator B462 to be observed after the hoop member 47 clasps the free end of the ISOFIX connection assembly 2.

As shown in FIGS. 29-34, in another specific embodiment of the present invention, the locking assembly 4 includes a lock hole 41 provided on the ISOFIX connection assembly 2, respective locking members 42 that mate with the lock holes 41 provided on the underbody front and rear sides of the seat body 1, and an unlocking button 43 provided on the seat body 1 for driving the locking members 42 along their axial movement. Similarly, the inner ends of two locking members 42 located on the same front or rear side of the underbody of the seat body 1 are elastically pressed against each other by an elastic member 44; and the locking assembly 4 on the front side of the underbody of the seat body 1 also includes a connecting shaft sleeve 422 rotatably connected to the corresponding locking member 42, and a supporting rod 423 connected to the locking member 42, which can be folded and flipped relative to the seat body 1. The connecting shaft sleeve 422 is axially connected and moved synchronously with the corresponding locking member 42, and the other end of the two supporting rods 423 has a lock pin 424 for insertion into the lock hole 41 when the ISOFIX connection assembly 2 is flipped to the front side of the underbody of the seat body 1 at the preset angle. The unlocking button 43 on the front side of the underbody of the seat body 1 is connected to the connecting shaft sleeve 422 to drive it and push the corresponding locking member 42 along its axial movement to unlock. Multiple sets of lock holes 41 can be set on the housing 22 of the ISOFIX connection assembly 2 according to the required adjustment angle, allowing the user to choose according to their needs, and the seat body 1 can thus obtain different inclination angles, increasing practicality.

Figure 29:
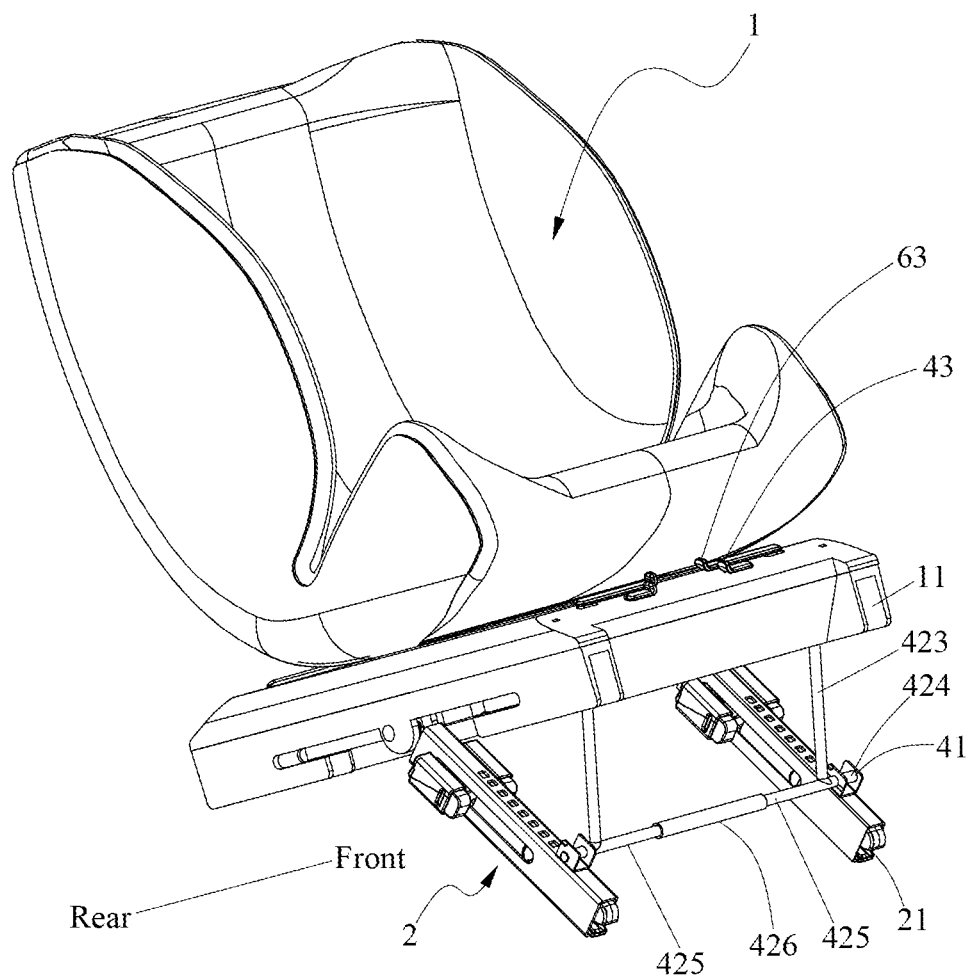
FIG. 29 is a schematic diagram of the three-dimensional structure of the adjustable elevation angle of the seat body in the invention.

In use, as shown in FIG. 29, firstly, the ISOFIX connection assembly 2 is unlocked, flipped, and self-rotated from the rear side to the front side of the underbody of the seat body 1 to a preset position required to obtain the desired angle of the seat body 1, then the supporting rod 423 is flipped, and the locking member 42 rotates within the connecting shaft sleeve 422 as the supporting rod 423 is flipped. When the supporting rod flips, the lock pin 424 is aligned with the lock hole 41 for insertion, and it can be inserted accordingly.

To ensure that the two supporting rods 423 are flipped synchronously and that the two lock pins 424 have enough elastic expansion space. The other end of the two supporting rods 423 is connected with a crossbar 425, and a guide sleeve 426 is slidably connected between the inner ends of the two crossbars 425. Inside the guide sleeve 426, a pushing springs 427 is provided to press the inner ends of the two crossbars 425 at both ends thereof. In the present invention, the lock pin 424 is formed by extending out from the crossbar 425. At the same time, as shown in FIG. 34, a limit protrusion 429 is provided on the crossbar 425 to limit the retraction of the two crossbars 425 into the guide sleeve 426, ensuring that when the supporting rods 423 are driven to move toward each other and are unlocked by the locking member 42, the two lock pins 424 can be correspondingly smoothly released from the lock hole 41.

Figure 30:
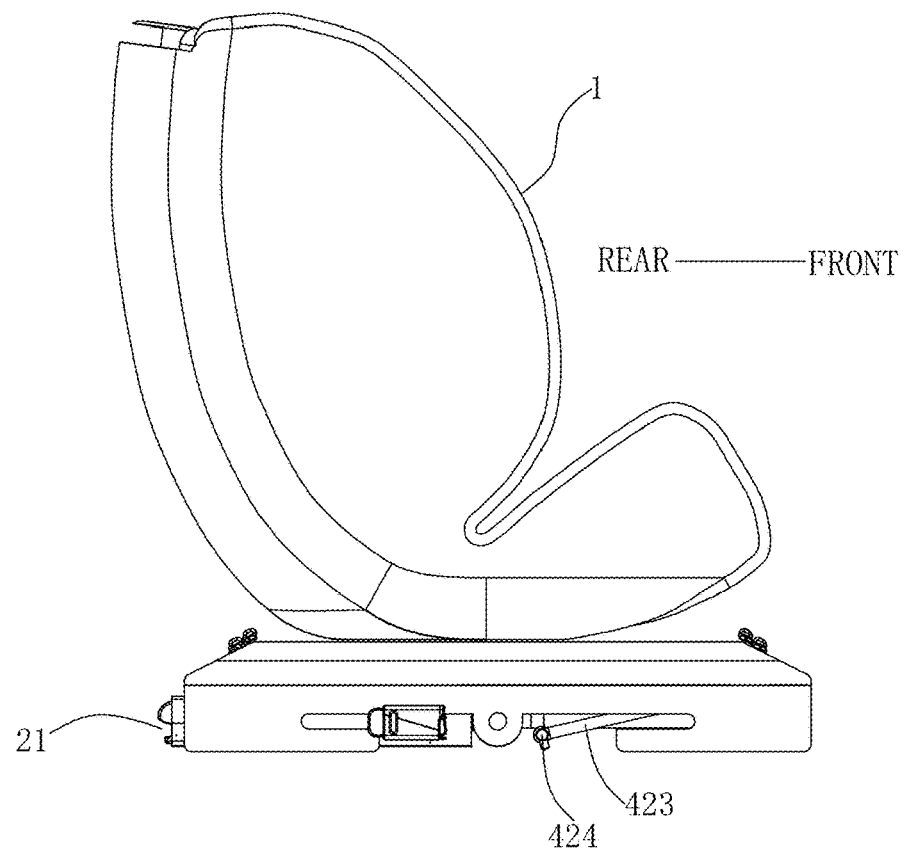
FIG. 30 is a side view of the adjustable elevation angle of the seat body of the present invention.
Figure 34:
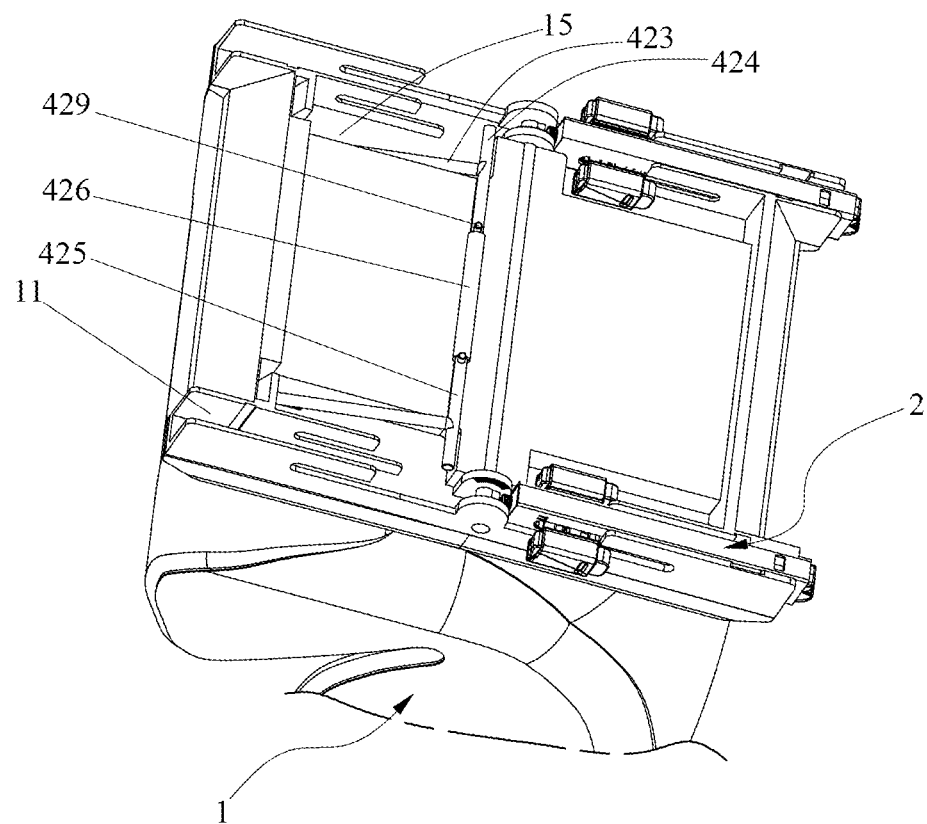
FIG. 34 is a schematic diagram of the structure of the supporting rod and crossbar of the seat body of the present invention with adjustable elevation angle, which are stowed in the block.

As shown in FIG. 34, the underbody of the seat body 1 has a slot 15 for accommodating the supporting rod 423. When the ISOFIX connection assembly 2 is unlocked and flipped to the front side of the underbody of the seat body 1 and there is no need to adjust the inclination of the seat body 1, the supporting rod 423 and the crossbar 425 are clipped into the slot 15. As shown in FIG. 30, when the ISOFIX connection assembly 2 is flipped and self-rotates to the preset position within the groove 11, the locking member 42 can be inserted into the lock hole 41.

Figure 31:
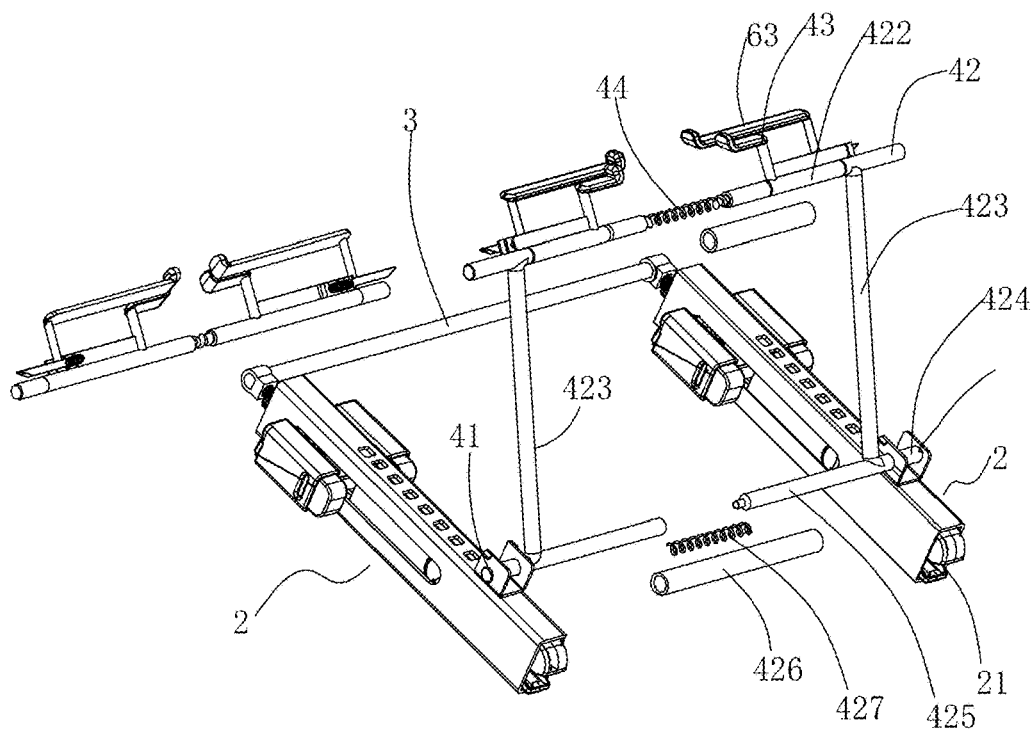
FIG. 31 is a schematic diagram of the connection structure between the locking assembly and the stop-lock linkage assembly of the adjustable elevation angle of the seat body of the present invention.
Figure 32:
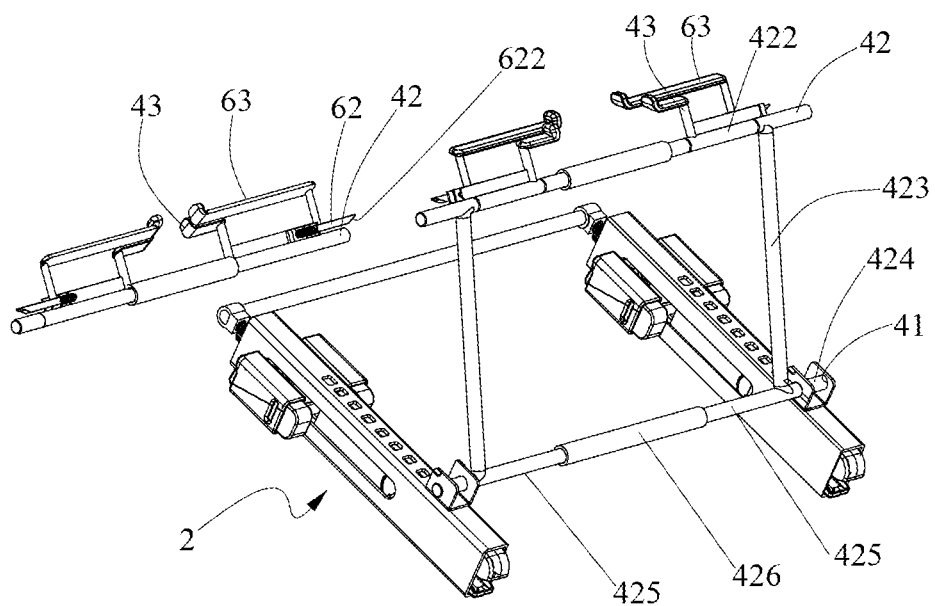
FIG. 32 is a schematic diagram of the locking assembly of the adjustable elevation angle of the seat body of the present invention and the connection structure in the locked state.

As shown in FIGS. 31 and 32, the underbody of the seat body 1 on the side of the locking assembly 4 is also provided with a stop-lock linkage assembly 6 which is used to brake the movement of the locking assembly 4 after unlocking, and when the ISOFIX connection assembly 2 is flipped and self-rotates to the preset position within the groove 11, triggering the locking assembly 4 to lock the ISOFIX connection assembly 2. The stop-lock linkage assembly 6 at the rear side of the underbody of the seat body 1 includes a flat spring 61 that moves in concert with the corresponding locking member 42, and a triggering member 62 that can elastically extend at one end from the underbody of the seat body 1 to trigger the locking member 42 when the ISOFIX connection assembly 2 is flipped and self-rotates to the preset position within the groove 11. The flat spring 61 has a curved catch portion 611, and the triggering member 62 is provided with a hook 621 which engages with the catch portion 611 when the unlocking button 43 is operated to drive the locking member 42 to slide out of the lock hole 41. The outer end of the triggering member 62 is provided with a guiding structure 622. When the ISOFIX connection assembly 2 is flipped and self-rotates to the preset position in the groove 11, the guiding inclined surface 222 on the connecting ear 221 then pushes against the guiding structure 622, causing the hook 621 on the triggering member 62 to squeeze the catch portion 611 on the flat spring 61 and producing an elastic deformation until the catch portion 611 disengages from the hook 621. In this way, the locking member 42 automatically locks the ISOFIX connection assembly 2 by inserting into the lock hole 41 under the action of the elastic member 44.

As shown in FIGS. 31 and 32, the stop-lock linkage assembly 6 located at the underbody front side of the seat body 1 comprises a flat spring 61 connected and moved synchronously with the connecting shaft sleeve 422, and a triggering member 62 that can elastically extend at one end from the underbody of the seat body 1 for triggering the locking member 42 when the ISOFIX connection assembly 2 is flipped and self-rotates to the preset position within the groove 11. The flat spring 62 has a curved catch portion 611, and the triggering member 62 is provided with a hook 621 designed to engage and cooperate with the catch portion 611. When the unlocking button 43 is operated to drive the connecting shaft sleeve 422 to press against the locking member 42, overcoming the elastic force of the elastic member 44 and causing it to retract and disengage from the lock hole 41, the catch portion 611 elastically slides along with the locking member 42 and engages with the hook 621, thereby immobilizing the locking member 42. The outer end of the triggering member 62 is provided with a guiding structure 622.

To ensure safe and reliable use, at least the front side of the underbody of the seat body 1 is provided with a triggering button 63. Each triggering button 63 is connected and moved synchronously with the triggering member 62, enabling the locking action of the locking member 42 to be triggered indirectly or directly by driving the triggering member 62. When the seat body 1 does not require an inclination adjustment, and the ISOFIX connection assembly 2 is flipped into the groove 11, the locking member 42 can be automatically inserted into the lock hole 41 by pressing the triggering member 62. If the ISOFIX connection assembly 2 is flipped into the groove 11 without the above result, the user can manually insert the locking member 42 into the lock hole 41 by operating the triggering button 63.

For the seat body 1 requiring the inclination adjustment and when the ISOFIX connection assembly 2 is flipped to an appropriate position at the front underbody of the seat body 1, releasing the supporting rod 423 allows it to rotate and align the lock pin 424 with the corresponding lock hole 41. The user can then insert the lock pin 424 into the lock hole 41 to achieve the inclination adjustment and locking by operating the triggering button 63.

Figure 33:
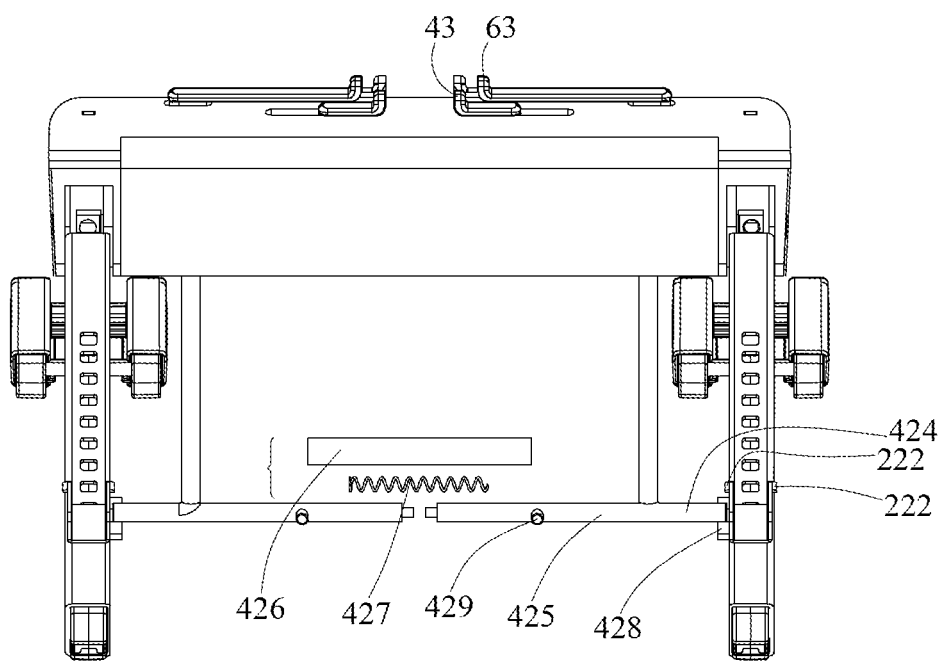
FIG. 33 is a schematic diagram of the decomposition of the crossbar, the pushing spring and the guide sleeve of the adjustable elevation angle of the seat body of the present invention.

As shown in FIG. 33, to ensure that the lock pin 424 is quickly and accurately aligned with the corresponding lock hole 41 during the flipping process of the support rod 423, a guiding slot 428 is provided at an edge of the lock hole 41 of the connecting ear 222, and when the ISOFIX connection assembly 2 is flipped to the front underbody of the seat body 1, the guiding slots 428 are located on the inner side of the housing 22.

What is claimed is:

1. A child safety seat with reversible ISOFIX connectors, comprising a seat body (1) and ISOFIX connection assemblies (2), wherein one end of the ISOFIX connection assembly (2) is a free end having an eccentric notch (21) for connecting with ISOFIX sockets of a car seat, characterized in that the other end of the ISOFIX connection assembly (2) is a rotating connection end that is flippable and connected to an underbody center of the seat body (1) and can be flipped forward or backward; a self-rotating linkage assembly (3) is installed between the rotating connection end of the ISOFIX connection assembly (2) and the seat body (1) to drive the ISOFIX connection assembly (2) to self-rotate along its longitudinal axis to adjust the eccentric notch (21) during a flipping process; a locking assembly (4) is provided between the ISOFIX connection assembly (2) and an underbody of the seat body (1) to lock the ISOFIX connection assembly (2) when the ISOFIX connection assembly (2) is flipped and self-rotates to a preset position; the self-rotating linkage assembly includes a gear (31) connected with the ISOFIX connection assembly (2) and a gear rack (32) fixedly attached to the underbody of the seat body (1), wherein the gear (31) meshes with the gear rack (32), enabling the ISOFIX connection assembly (2) to self-rotate along its longitudinal axis during the flipping process; the underbody of the seat body (1) is equipped with a connection shaft (5), and the self-rotating linkage assembly (3) further comprises a flipping joint (33) connected with the connection shaft (5), wherein the flipping joint (33) is rotatably connected with the rotating connection end of the ISOFIX connection assembly (2).

2. The child safety seat with reversible ISOFIX connectors according to claim 1, wherein the rotating connection end of the ISOFIX connection assembly (2) is equipped with a screw connection (34), and the flipping joint (33) is provided with a threaded connection hole (35) that mates with the screw connection (34), allowing the ISOFIX connection assembly (2) to self-rotate relative to the flipping joint (33) during the flipping process; the flipping joint (33) is connected and rotates synchronously with the connection shaft (5) to enable the ISOFIX connection assemblies (2) located on both sides of the underbody of the seat body (1) to flip forward or backward synchronously.

3. The child safety seat with reversible ISOFIX connectors according to claim 1, wherein the ISOFIX connection assembly (2) comprises a housing (22) and a connector core (23) that is telescopically adjustable within the housing (22) with the eccentric notch (21) located at a free end of the connector core (23), wherein the ISOFIX connection assembly (2) further comprises locking adjustment buttons (24) located on both sides of the housing (22) to adjust telescopic movements of the connector core (23) relative to the housing (22); the underbody of the seat body (1) is provided with a groove (11) to accommodate the ISOFIX connection assembly (2), and a side of the groove (11) on the underbody of the seat body (1) is provided with a clearance space (12) to avoid interference with the movement of the locking adjustment button (24).

4. The child safety seat with reversible ISOFIX connectors according to claim 1, wherein the underbody of the seat body (1) is further provided with a stop-lock linkage assembly (6) on a side of the locking assembly (4), and the stop-lock linkage assembly (6) is used to brake and lock movements of the locking assembly (4) when the locking assembly (4) is unlocked, and when the ISOFIX connection assembly (2) is flipped and self-rotates to the preset position, the stop-lock linkage assembly (6) triggers the locking assembly (4) to lock the ISOFIX connection assembly (2); the locking assembly (4) comprises two lock holes (41) provided on the housing (22), respective two locking members (42) that are inserted into or withdrawn from the two lock holes (41) provided on front and rear sides of the underbody of the seat body (1), and an unlocking button (43) provided on the seat body (1) for driving each of the two locking members (42).

5. The child safety seat with reversible ISOFIX connectors according to claim 4, wherein the locking assembly (4) further comprises an elastic member (44) for elastically pressing the two locking members (42); the stop-lock linkage assembly (6) comprises a flat spring (61) that moves and connects with the corresponding locking member (42) of the two locking members (42) together, and a triggering member (62) that elastically extends from the underbody of the seat body (1) to trigger the corresponding locking member (42) when the ISOFIX connection assembly (2) is flipped and self-rotates to the preset position; the flat spring (61) comprises a curved catch portion (611), and the triggering member (62) is provided with a hook (621) that engages the catch portion (611) when the corresponding locking member (42) is slid out of the corresponding lock hole (41) by operating the unlocking button (43); an outer end of the triggering member (62) is provided with a guiding structure (622) so that when the outer end of the triggering member (62) is pushed by the ISOFIX connection assembly (2), and the hook (621) pushes the flat spring (61) to deform, causing the hook (621) to disengage from the catch portion (611) and the corresponding locking member (42) to elastically insert into the corresponding lock hole (41).

6. The child safety seat with reversible ISOFIX connectors according to claim 4, wherein an outer end of each locking member (42) is provided with a color indicator A (421), and the seat body (1) is also provided with a window A (13) for observing the color indicator A (421) after the corresponding locking member (42) is inserted into the corresponding lock hole (41).

7. The child safety seat with reversible ISOFIX connectors according to claim 1, wherein the locking assembly (4) comprises a locking rotating member (45), a pulling hook (46), and a hoop member (47); wherein a center of the locking rotating member (45) is rotatably connected with the underbody of the seat body (1) through a pivot (451), and the pulling hook (46) is elastically and slidably connected to the underbody of the seat body (1); one end of the locking rotating member (45) is provided with a notch (452) for buckling the pulling hook (46), the other end of the locking rotating member (45) is eccentrically pivotally connected to the hoop member (47); when the notch (452) is buckled with the pulling hook (46), the hoop member (47) is flipped to clasp the free end of the ISOFIX connection assembly (2) to lock the ISOFIX connection assembly (2).

8. The child safety seat with reversible ISOFIX connectors according to claim 7, wherein the locking assembly (4) further comprises an elastic damping member (461) placed on the seat body (1) for elastically pressing against the pulling hook (46), and an arm of force applied to the notch (452) by the pulling hook (46) is greater than an arm of force applied to the locking rotating member (45) by the hoop member (47).

9. The child safety seat with reversible ISOFIX connectors according to claim 7, wherein a sliding end of the pulling hook (46) is provided with a color indicator B (462), and the seat body (1) is provided with a window B (14) for observing the color indicator B (462).

10. The child safety seat with reversible ISOFIX connectors according to claim 6, wherein the stop-lock linkage assembly (6) further comprises a triggering button (63) provided on the seat body (1), and each triggering button (63) is connected and moved synchronously with the trigger member (62) to trigger the corresponding locking member (42) for locking.

11. The child safety seat with reversible ISOFIX connectors according to claim 1, wherein the locking assembly (4) comprises two lock holes (41) provided on the ISOFIX connection assembly (2), respective two locking members (42) provided on front and rear sides of the underbody of the seat body (1) to mate with the two lock holes (41), and an unlocking button (43) provided on the seat body (1) to drive each of the two locking members (42) to move along their axial direction; the locking assembly (4) on the front side of the underbody of the seat body (1) further comprises a connection shaft sleeve (422) rotatably connected to the corresponding locking member (42), and a supporting rod (423) connected to the corresponding locking member (42), which rotates and flips around the locking member (42) relative to the seat body (1); the connection shaft sleeve (422) is also axially connected and moved synchronously with the corresponding locking member (42); the other end of each of the two supporting rods (423) is equipped with a lock pin (424) inserted into the corresponding lock hole (41) on the front side of the underbody of the seat body (1) when the ISOFIX connection assembly (2) is flipped to a preset angle; the unlocking button (43) on the front side of the underbody of the seat body (1) is connected with the connection shaft sleeve (422) to drive the connection shaft sleeve (422) to push the corresponding locking member (42) to move axially and unlock.

12. The child safety seat with reversible ISOFIX connectors according to claim 11, wherein the underbody of the seat body (1), on the side of the locking assembly (4), is also provided with a stop-lock linkage assembly (6), and the stop-lock linkage assembly (6) located at the rear side of the underbody of the seat body (1) comprises a flat spring (61) moving synchronously with the corresponding locking member (42), and a triggering member (62) that elastically extends at one end from the underbody of the seat body (1) to trigger the corresponding locking member (42) when the ISOFIX connection assembly (2) is flipped and self-rotates to the preset position; the flat spring (61) comprises a curved catch portion (611), and the triggering member (62) is provided with a hook (621) which engages with the catch portion (611) when the unlocking button (43) is operated to drive the corresponding locking member (42) to slide out of the corresponding lock hole (41); an outer end of the triggering member (62) is provided with a guiding structure (622); the stop-lock linkage assembly (6) located on the front side of the underbody of the seat body (1) comprises a flat spring (61) connected to and moved synchronously with the connecting shaft sleeve (422), and a triggering member (62) that elastically extends at one end from the underbody of the seat body (1) for triggering the corresponding locking member (42) when the ISOFIX connection assembly (2) is flipped and self-rotates to the preset position; the flat spring (61) comprises a curved catch portion (611), and the triggering member (62) is provided with a hook (621) designed to engage and match with the catch portion (611) when the unlocking button (43) is operated to drive the connecting shaft sleeve (422) to press against the corresponding locking member (42) to retract and disengage from the lock hole (41).

13. The child safety seat with reversible ISOFIX connectors according to claim 12, wherein at least the front side of the underbody of the seat body (1) is provided with a triggering button (63), each triggering button (63) is connected and moved synchronously with the triggering member (62), enabling the locking action of the corresponding locking member (42) to be triggered indirectly or directly by driving the triggering member (62).

14. The child safety seat with reversible ISOFIX connectors according to claim 12, wherein the other end of each of the two supporting rods (423) is connected with a crossbar (425), and a guide sleeve (426) is slidably connected between inner ends of the two crossbars (425), and inside of the guide sleeve (426), a pushing spring (427) is provided to press the inner ends of the two crossbars (425) at both ends of the two crossbars (425).

\* \* \* \* \*